United States Patent
Hwang et al.

(10) Patent No.: US 10,536,924 B2
(45) Date of Patent: Jan. 14, 2020

(54) APPARATUS AND METHOD FOR POSITIONING TERMINAL IN WIRELESS COMMUNICATION SYSTEM

(71) Applicants: Samsung Electronics Co., Ltd, Suwon-si (KR); Research & Business Foundation Sungkyunkwan University, Suwon-si (KR)

(72) Inventors: Wonjun Hwang, Suwon-si (KR); Hyung-Jin Choi, Seoul (KR); Han Jun Kim, Seoul (KR); Kyunghoon Lee, Suwon-si (KR); Hyunseok Ryu, Yongin-si (KR); Min Jang, Seongnam-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 12 days.

(21) Appl. No.: 15/623,282

(22) Filed: Jun. 14, 2017

(65) Prior Publication Data
US 2017/0367067 A1    Dec. 21, 2017

(30) Foreign Application Priority Data
Jun. 15, 2016    (KR) .................. 10-2016-0074572

(51) Int. Cl.
*H04W 24/00*    (2009.01)
*H04W 64/00*    (2009.01)
(Continued)

(52) U.S. Cl.
CPC ........ *H04W 64/006* (2013.01); *H04B 17/327* (2015.01); *H04W 4/023* (2013.01); *H04W 56/007* (2013.01); *H04W 76/14* (2018.02)

(58) Field of Classification Search
CPC ......... H04W 4/22; H04W 64/00; H04W 4/02; H04W 48/04
(Continued)

(56) References Cited

U.S. PATENT DOCUMENTS 5,974,329 A * 10/1999 Wylie .................. G01S 5/0215
                                                            342/457
6,507,574 B1 * 1/2003 Kitade .................. H04B 1/707
                                                            370/335
(Continued)

OTHER PUBLICATIONS

"3rd Generation Partnership Project; Technical Specification Group Radio Access Network; Study on LTE Device to Device Proximity Services; Radio Aspects (Release 12)," 3GPP TR 36.843, V12.0.1, Mar. 2014, 50 pages.
(Continued)

*Primary Examiner* — Matthew W Genack

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for operating of a terminal in a wireless communication system according to an exemplary embodiment includes: receiving signals from other terminals; selecting another terminal which has proximity to the terminal from among the other terminals based on reception powers of the signals and information related to the signals; and determining a location of the terminal based on location information of the other terminals.

10 Claims, 47 Drawing Sheets

(51) Int. Cl.
*H04B 17/327* (2015.01)
*H04W 4/02* (2018.01)
*H04W 56/00* (2009.01)
*H04W 76/14* (2018.01)

(58) Field of Classification Search
USPC .............................................. 455/404.2, 457
See application file for complete search history.

(56) References Cited

U.S. PATENT DOCUMENTS

| | | | |
|---|---|---|---|
| 7,577,445 B2 | 8/2009 | Guvenc et al. | |
| 8,219,111 B2 | 7/2012 | Guvenc et al. | |
| 8,655,377 B2 | 2/2014 | Soma et al. | |
| 9,207,305 B2 | 12/2015 | AlSindi et al. | |
| 2010/0265140 A1* | 10/2010 | Sohn ..................... | G01S 5/0072 342/451 |
| 2011/0028175 A1* | 2/2011 | Chang ..................... | G01S 5/02 455/509 |
| 2011/0053582 A1* | 3/2011 | Mueck ................. | H04W 48/14 455/419 |
| 2011/0070874 A1* | 3/2011 | Dominguez Romero ................... | H04W 16/08 455/418 |
| 2011/0074632 A1* | 3/2011 | Yeo ..................... | G01S 5/0273 342/387 |
| 2011/0130099 A1* | 6/2011 | Madan .............. | H04W 72/1226 455/63.1 |
| 2013/0194942 A1* | 8/2013 | Hu ........................... | G01S 5/04 370/252 |
| 2014/0287744 A1* | 9/2014 | Ye ......................... | H04W 4/80 455/426.1 |
| 2015/0201319 A1* | 7/2015 | Deng ................... | H04W 48/16 455/452.1 |
| 2015/0222342 A1* | 8/2015 | Liu ..................... | H04B 7/0413 375/295 |
| 2015/0223184 A1* | 8/2015 | Bergstrom ........ | H04W 56/0045 370/329 |
| 2015/0256429 A1* | 9/2015 | Yoshizawa ........ | H04W 56/0045 370/252 |
| 2015/0338512 A1* | 11/2015 | HomChaudhuri .... | G01S 13/765 370/252 |
| 2016/0088568 A1* | 3/2016 | Webb .................. | H04W 52/346 455/450 |
| 2017/0026990 A1* | 1/2017 | Lu ....................... | H04W 72/044 |
| 2017/0070961 A1* | 3/2017 | Bharadwaj .......... | H04W 52/228 |

OTHER PUBLICATIONS

"3rd Generation Partnership Project; Technical Specification Group Radio Access Network; LTE Device to Device (D2D) Proximity Services (ProSe); User Equipment (UE) Radio Transmission and Reception (Release 12)," 3GPP TR 36.877, V12.0.0, Mar. 2015, 40 pages.

"3rd Generation Partnership Project; Technical Specification Group Radio Access Network; Study on Indoor Positioning Enhancements for UTRA and LTE (Release 13)," 3GPP TR 37.857, V13.1.0, Dec. 2015, 82 pages.

"Analysis of Anchored and Non-Anchored D2D Aided Positioning," 3GPP TSG RAN WG1 Meeting #82, Intel Corporation, R1-153991, Beijing, China, Aug. 24-28, 2015, 6 pages.

"Analysis of Proximity Detection for D2D Aided Positioning," 3GPP TSG RAN WG1 Meeting #82, Intel Corporation, R1-153992, Beijing, China, Aug. 24-28, 2015, 3 pages.

"Guidelines for Evaluation of Radio Interface Technologies for IMT-Advanced," Report ITU-R M. 2135-1, International Telecommunication Union, ITU-R Radiocommunication Sector of ITU, M Series, Mobile Radiotelecommunication, Amateur and Related Services, Dec. 2009, 72 pages.

Meinila, J., et al., "D5.3: Winner+ Final Channel Models," Winner+, Celtic Telecommunication Solutions, Jun. 30, 2010, 107 pages.

Khodjaev, J., et al., "Survey of NLOS Identification and Error Mitigation Problems in UWB-based Positioning Algorithms for Dense Environments," Annals of Telecommunications, Aug. 4, 2009, pp. 301-311.

Kyosti, P., et al., "Winner II Channel Models, Part 1 Channel Models," IST-4-027756 Winner II D1.1.2 V1.2, Winner, Information Society Technologies, Version 1.1, 82 pages.

* cited by examiner

APPARATUS AND METHOD FOR POSITIONING TERMINAL IN WIRELESS COMMUNICATION SYSTEM

CROSS-REFERENCE TO RELATED APPLICATION(S) AND CLAIM OF PRIORITY

The present application is related to and claims priority under 35 U.S.C. § 119 to Korean Patent Application No. 10-2016-0074572, which was filed in the Korean Intellectual Property Office on Jun. 15, 2016, the contents of which are incorporated herein by reference.

TECHNICAL FIELD

Various exemplary embodiments relate to a wireless communication system, and more particularly, to an apparatus and a method for positioning a terminal.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As mobile communication technology has developed like the above-described 5G system, exact positioning for a user of a terminal is required in order to provide various services to the user. Accordingly, various technologies related to positioning of terminals in mobile communication systems are developing. Specifically, technology related to positioning of a terminal is largely divided into two types of techniques according to how coordinates of a terminal are estimated: a proximity-based positioning technique for determining a position of a terminal based on a position of a closest reference point; and a trilateration-based positioning technique for obtaining a relative position of a terminal from a specific reference point using triangular geometry. Specifically, in the case of a commercialized long term evolution (LTE) system, an assisted global navigation satellite system (A-GNSS)-based positioning technique, an enhanced-cell ID (E-CID)-based positioning technique which uses a base station identifier (ID), transmission and reception timing advance (TA) between a base station and a terminal, and an angle of arrival (AoA), or the like may be supported.

SUMMARY

To address the above-discussed deficiencies, it is a primary object to provide an apparatus and a method for positioning a terminal in a wireless communication system.

Various exemplary embodiments also provide an apparatus and a method for positioning a terminal based on proximity in a wireless communication system.

Various exemplary embodiments also provide an apparatus and a method for positioning a terminal using a device-to-device (D2D) signal in a wireless communication system.

Various exemplary embodiments also provide an apparatus and a method for determining a communication environment of a terminal using a D2D signal in a wireless communication system.

According to an aspect of the present disclosure, a method for operating of a terminal in a wireless communication system includes: receiving signals from other terminals; selecting another terminal which has proximity to the terminal from among the other terminals based on reception powers of the signals and information related to the signals; and determining a location of the terminal based on location information of the another terminals.

According to another aspect of the present disclosure, a terminal in a wireless communication system includes: a receiver configured to receive signals from other terminals; and a controller configured to select another terminal which has proximity to the terminal from among the other terminals based on reception powers of the signals and information related to the signals, and determine a location of the terminal based on location information of the another terminals.

According to another aspect of the present disclosure, a method for operating of a terminal in a wireless communication system includes: receiving a signal from another terminal; determining a first value which changes according to a distance between another terminal and a base station using the signal; and determining whether a link between another terminal and the base station is non-line of sight (NLOS) based on the first value and a second value which changes according to a distance between the terminal and the base station.

According to another aspect of the present disclosure, a terminal in a wireless communication system includes: a receiver configured to receive a signal from another terminal; and a controller configured to determine a first value which changes according to a distance between another terminal and a base station using the signal, and determine whether a link between another terminal and the base station is NLOS based on the first value and a second value which changes according to a distance between the terminal and the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 47, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Hereinafter, the present disclosure describes technology for positioning a terminal in a wireless communication system. Specifically, the present disclosure describes technology for positioning a terminal using a device-to-device (D2D) signal for D2D communication.

Terms indicating attributes of signals, terms indicating control information, terms indicating network entities, terms indicating messages, terms indicating elements of a device, or the like, which are used in the following description, are merely examples for convenience of explanation. Accordingly, the present disclosure is not limited to the terms which will be described below and other terms having the same technical meanings may be used.

In addition, the terms and the names defined in the $3^{rd}$ generation partnership project (3GPP) standards will be used for convenience of explanation, but the present disclosure is not limited to these terms and names and can be equally applied to systems according to the other standards.

Figure 1:
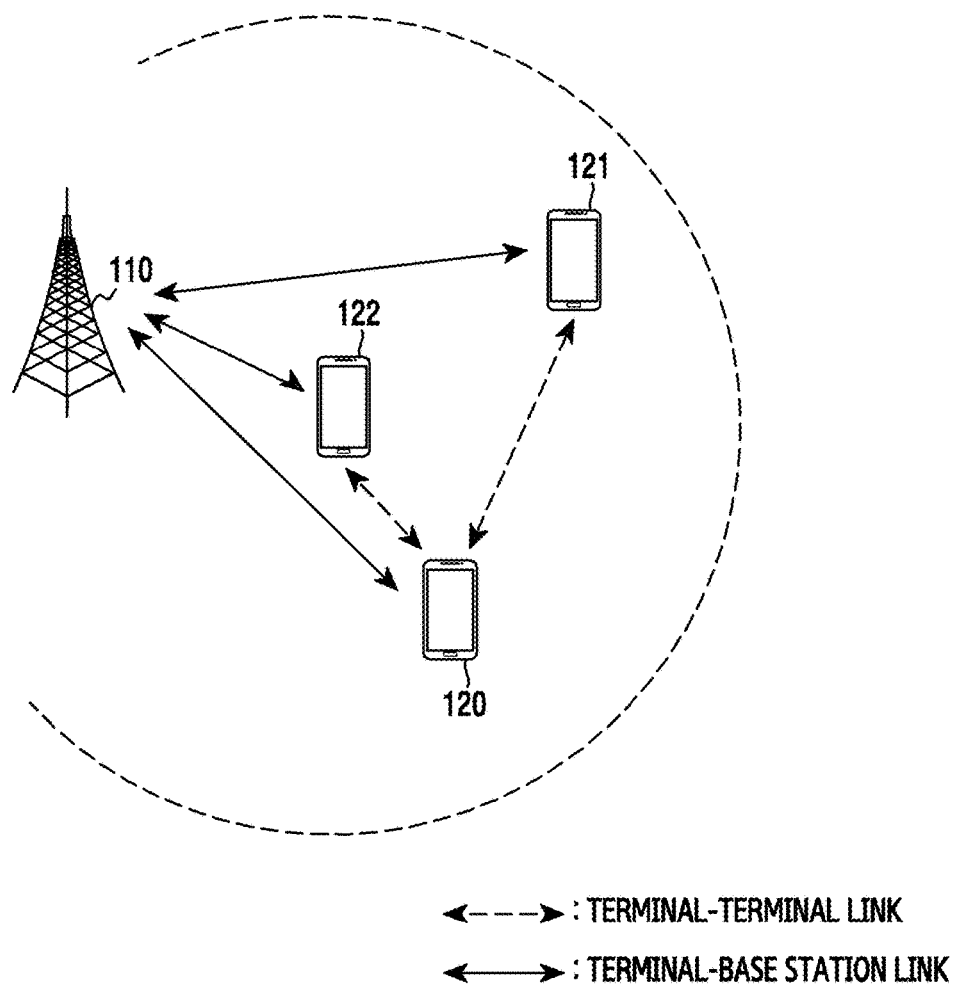
FIG. 1 illustrates an example wireless communication system according to an exemplary embodiment of the present disclosure.

FIG. 1 illustrates an example wireless communication system according to an exemplary embodiment of the present disclosure. Referring to FIG. 1, the system includes a base station 110 and terminals 120, 121, and 122.

Each of the terminals 120, 121, and 122 is a device which is used by a user, and communicates with the base station 110 via a radio channel. In addition, each of the terminals 120, 121, and 122 may communicate with other terminals through a terminal-terminal link, that is, a direct link. That is, the terminal 120 may perform D2D communication with the terminals 121 and 122. In the present disclosure, signals exchanged among the terminals 120, 121, and 122 for D2D communication will be referred to as "D2D signals." In addition, in the present disclosure, a terminal performing D2D communication will be referred to as a "D2D terminal."

The D2D signal may be classified according to a purpose of a signal. For example, the D2D signal may be classified into a communication signal for delivering data, a discovery signal for discovering a neighbor terminal, a synchronization signal for synchronizing with a neighbor terminal, or the like. When various embodiments of the present disclosure are applied to a system conforming to the 3GPP LTE standard, a sidelink communication signal, a sidelink discovery signal, a sidelink synchronization signal may be used as a communication signal, a discovery signal, and a synchronization signal, respectively. In the following description, the D2D signal includes a communication signal, a discovery signal, a synchronization signal, or a signal for another D2D communication.

The base station 110 provides a wireless access to the terminals 120, 121, and 122. The base station 110 has a coverage including a predetermined geographical range. The base station 110 may be referred to as a node B (NB) or an evolved node B (eNB). The base station 110 may have location information regarding the terminals 121 and 122. That is, the base station 110 may have already estimated a location of at least one of the terminals located within a cell. For example, at least one of the terminal 121 and the terminal 122 may be a stationary terminal. Alternatively, the location of at least one of the terminal 121 and the terminal 122 may already be estimated by various positioning technologies.

Figure 2:
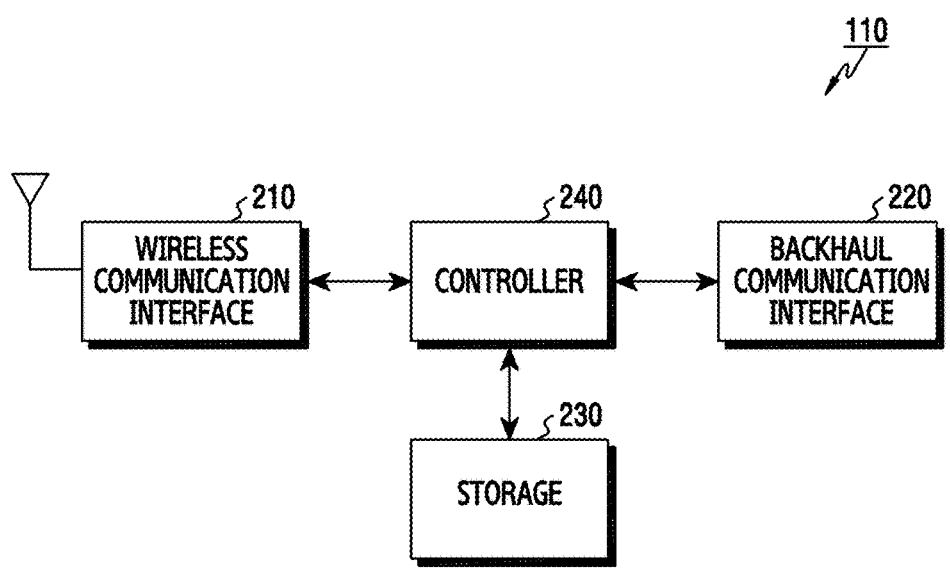
FIG. 2 illustrates an example configuration of a base station in a wireless communication system according to an exemplary embodiment of the present disclosure.

FIG. 2 illustrates an example configuration of a base station in a wireless communication system according to an exemplary embodiment of the present disclosure. FIG. 2 illustrates an example of a configuration of the base station 110. Hereinafter, the term "unit" or the term ending with the suffix "-er" or "-or" refer to a unit for processing at least one function or operation and these terms may be implemented by using hardware or software or a combination of hardware and software. Referring to FIG. 2, the base station includes a wireless communication interface 210, a backhaul communication interface 220, a storage 230, and a controller 240.

The wireless communication interface 210 performs functions for transmitting and receiving signals via a radio channel. For example, the wireless communication interface 210 performs a function of converting between a baseband signal and a bit string according to a physical layer standard of a system. For example, when transmitting data, the wireless communication interface 210 generates complex symbols by encoding and modulating a transmission bit string. In addition, when receiving data, the wireless communication interface 210 restores a reception bit string by demodulating and decoding a baseband signal. In addition, the wireless communication interface 210 up-converts a baseband signal into a radio frequency (RF) band signal and then transmit the RF band signal through an antenna, and down-converts an RF band signal received through the antenna into a baseband signal. For example, the wireless communication interface 210 may include a transmission filter, a reception filter, an amplifier, a mixer, an oscillator, a digital to analog converter (DAC), an analog-to-digital converter (ADC), or the like.

In addition, the wireless communication interface 210 may include a plurality of RF chains. Furthermore, the wireless communication interface 210 may perform beamforming. To perform the beamforming, the wireless communication interface 210 may adjust a phase and a size of each of the signals transmitted and received through a plurality of antennas or antenna elements.

The wireless communication interface 210 transmits and receives signals as described above. Accordingly, the wireless communication interface 210 may be referred to as a transmission interface, a reception interface, a transmission and reception interface, a transmitter, a receiver or a transceiver. In addition, in the following description, transmitting and receiving performed through a radio channel may include processing by the wireless communication interface 210 as described above.

The backhaul communication interface 210 provides an interface for communication with other nodes in a network. That is, the backhaul communication interface 210 converts a bit string to be transmitted from the base station to another node, for example, another access node, another base station, a core network, or the like into a physical signal, and converts a physical signal received from another node into a bit string.

The storage 230 stores data such as a basic program for the operation of the base station, an application program, setting information, or the like. The storage 230 may be configured by a volatile memory, a nonvolatile memory, or a combination of a volatile memory and a nonvolatile memory.

The controller 240 controls overall operations of the base station. For example, the controller 240 transmits and receives signals through the wireless communication interface 210 or the backhaul communication interface 220. In addition, the controller 240 records and reads data on and from the storage 230. To achieve this, the controller 240 may include at least one processor. According to an exemplary embodiment of the present disclosure, the controller 240 performs functions for positioning a terminal. For example, the controller 240 may control the base station to perform a procedure according to various exemplary embodiments, which will be described below.

Figure 3:
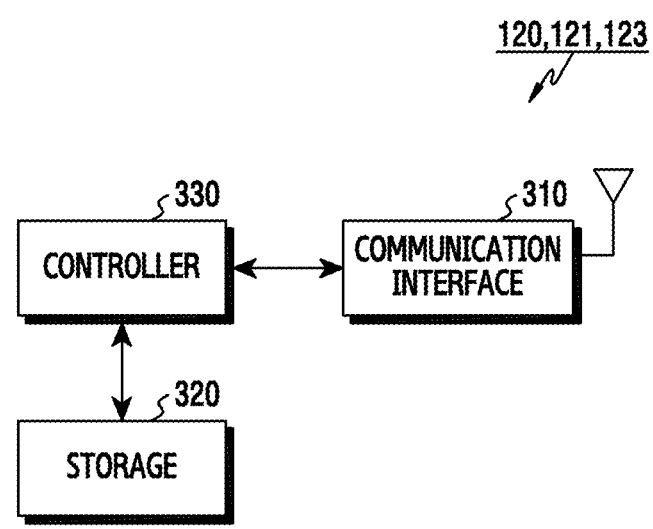
FIG. 3 illustrates an example configuration of a terminal in a wireless communication system according to an exemplary embodiment of the present disclosure.

FIG. 3 illustrates an example configuration of a terminal in a wireless communication system according to an exemplary embodiment of the disclosure. FIG. 3 illustrates an example of a configuration of the terminal 120, 121, or 122. Hereinafter, the term "unit" or the term ending with the suffix "-er" or "-or" refer to a unit for processing at least one function or operation and these terms may be implemented by using hardware or software or a combination of hardware and software. Referring to FIG. 3, the terminal includes a communication interface 310, a storage 320, and a controller 330.

The communication interface 310 performs functions for transmitting and receiving signals via a radio channel. For example, the communication interface 310 performs a function of converting between a baseband signal and a bit string according to a physical layer standard of a system. For example, when transmitting data, the communication interface 310 generates complex symbols by encoding and modulating a transmission bit string. In addition, when receiving data, the communication interface 310 restores a reception bit string by demodulating and decoding a baseband signal. In addition, the communication interface 310 up-converts a baseband signal into an RF band signal and then transmit the RF band signal through an antenna, and down-converts an RF band signal received through the antenna into a baseband signal. For example, the communication interface 310 may include a transmission filter, a reception filter, an amplifier, a mixer, an oscillator, a DAC, an ADC, or the like.

The communication interface 310 transmits and receives signals as described above. Accordingly, the communication interface 310 may be referred to as a transmission interface, a reception interface, a transmission and reception interface, a transmitter, a receiver or a transceiver. In addition, in the following description, transmitting and receiving performed through a radio channel may include processing by the communication interface 310 as described above.

The storage 320 stores data such as a basic program for the operation of the terminal, an application program, setting information, or the like. The storage 310 may be configured by a volatile memory, a nonvolatile memory, or a combination of a volatile memory and a nonvolatile memory. In addition, the storage 320 provides stored data in response to a request of the controller 330.

The controller 330 controls overall operations of the terminal. For example, the controller 330 transmits and receives signals through the communication interface 310. In addition, the controller 330 records and reads data on and from the storage 320. To achieve this, the controller 330 may include at least one processor or microprocessor or may be a part of the processor. In addition, a part of the communication interface 310 and the controller 330 may be referred to as a communication processor (CP). In particular, the controller 330 may perform D2D signaling for positioning of the terminal and may measure information related to the D2D signal according to various exemplary embodiments which will be described below. For example, the controller 330 may control the terminal to perform a procedure according to various exemplary embodiments which will be described below.

In an environment as shown in FIG. 1, that is, in an environment in which the locations of the other terminals 121 and 122 located in the proximity of the terminal 120 are estimated, positioning of the terminal 120 may be performed by using D2D signals. In other words, D2D-aided positioning may be performed. Specifically, according to various exemplary embodiments, proximity-based positioning may be performed by using D2D signals. The proximity-based positioning refers to a technique for estimating a location of a target based on the location of the closest device to the target from among the devices of which the locations have been already grasped.

Since the number of terminals is larger than the number of base stations in a normal cell environment, the proximity-based positioning using the D2D signals may provide a high degree of accuracy. On the other hand, in the case of trilateration-based positioning using a demodulation reference signal (DM-RS) of a short length included in a D2D signal, it is difficult to estimate timing exactly due to a narrow bandwidth of D2D communication. Since it is impossible that all D2D signals have a full-band DM-RS due to the D2D signal configuration even on the assumption of the full band DM-RS, it is estimated that timing detection performance is greatly degraded. In addition, since it is impossible to measure round-trip time (RTT) with all D2D terminals on the assumption of ideal RTT, a measurement error may additionally occur due to a difference between DM-RS transmission times of terminals. Accordingly, in the case of the D2D environment, the proximity-based positioning is expected to be efficient.

The proximity-based D2D-aided positioning is a technique which utilizes reception powers related to signals transmitted by D2D terminals located in the proximity of a target terminal. A target terminal may compare power levels of signals received from D2D terminals, and may determine a location of a D2D terminal which has transmitted a signal corresponding to the maximum reception power as the target terminal's location. In this case, a case in which the D2D terminals have the same transmission power and a case in which the D2D terminals have different transmission powers may be considered.

Figure 4A:
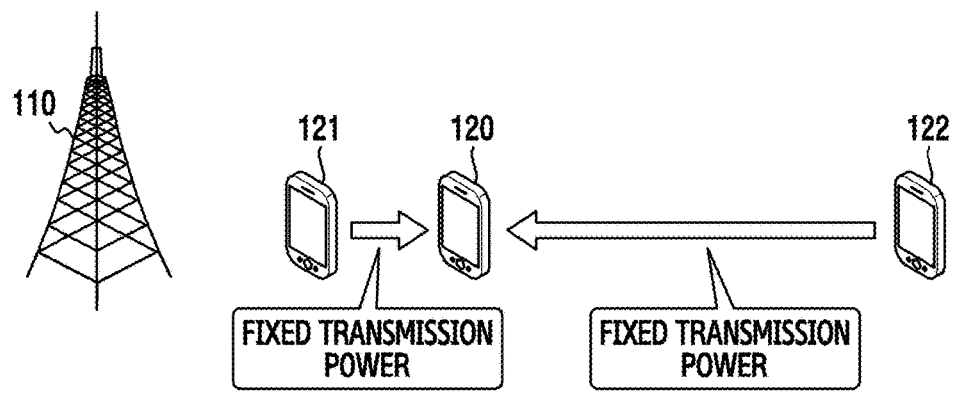
FIGS. 4A and 4B illustrate example changes in transmission powers according to power control in a wireless communication system according to an exemplary embodiment of the present disclosure.
Figure 4B:
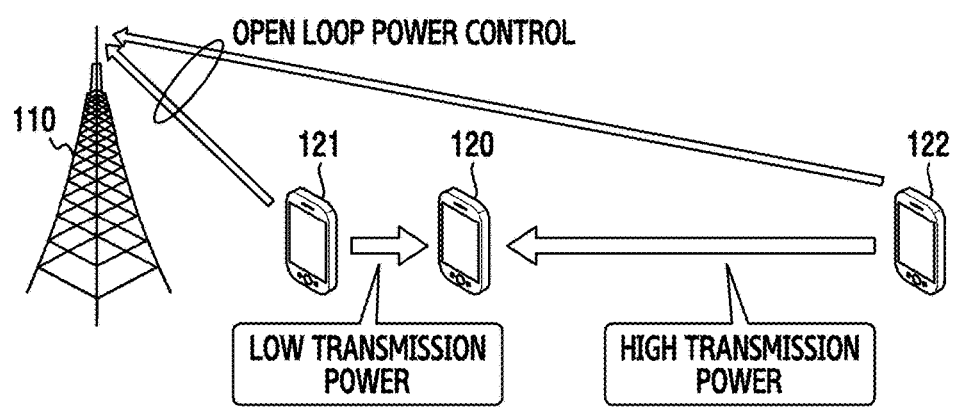

FIGS. 4A and 4B illustrate examples changes in transmission powers according to power control in a wireless communication system according to an exemplary embodiment of the present disclosure. FIG. 4A illustrates a case in which the terminals 121 and 122 have fixed transmission powers, that is, the same transmission powers, and FIG. 4B illustrates a case in which the terminals 121 and 122 have different transmission powers.

Referring to FIG. 4A, when the D2D terminals 121 and 122 transmit signals with the same transmission power, the reception power is reduced in proportion to a distance to the terminal 120. Accordingly, as the distance to the terminal 120 is shorter, a reception power of a signal increases. Therefore, positioning may be performed with reference to the reception power.

Referring to FIG. 4B, the terminals 121 and 122 may transmit signals with different transmission powers since open loop power control is performed. In other words, since the terminals 121 and 122 transmit signals with transmission powers to which open loop power control is applied by considering an uplink interference to the base station 110, the terminals 121 and 122 use different transmission powers. Specifically, the terminal 121 uses a relatively low transmission power and the terminal 122 uses a relatively high transmission power. That is, in the open loop power control environment, as a distance to the base station 110 is longer, a higher transmission power is allocated. In this case, a reception power of a signal transmitted from the D2D terminal 122 which is far from the terminal 120 may be greater than a reception power of a signal transmitted from the D2D terminal 121 which is close to the terminal 120, and an error which causes the terminal 120 to determine the location of the D2D terminal 122 which is far therefrom as the terminal 120's location may occur. As a result, since the D2D terminals 121 and 122 have different transmission powers due to the open loop power control, a proportional relation between a reception power level of a signal and proximity may not be established.

Accordingly, various exemplary embodiments for correcting an error in positioning, caused by different transmission powers, will be described. According to various exemplary embodiments, the terminal 120 may additionally use other information in addition to the reception powers which can be obtained from the D2D signals transmitted from the D2D terminals 121 and 122. That is, according to various exemplary embodiments, a D2D terminal is selected by considering reception powers of signals received by a target terminal and other information in addition to the reception powers, such that accuracy of positioning of the proximity-based D2D-aided positioning can be enhanced.

Figure 5:
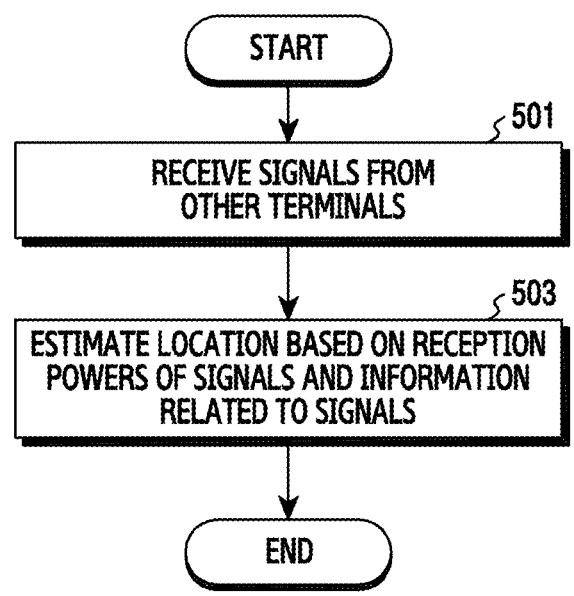
FIG. 5 illustrates an example method for operating of a terminal in a wireless communication system according to an exemplary embodiment of the present disclosure.

FIG. 5 illustrates an example method for operating of a terminal in a wireless communication system according to an exemplary embodiment of the present disclosure. FIG. 5 illustrates an example of a method for operating of a terminal which performs positioning, for example, of the terminal 120.

Referring to FIG. 5, in step 501, the terminal receives signals from other terminals. The signals are D2D signals and at least one signal may be received from each of the other terminals.

Next, in step 503, the terminal estimates a location based on reception powers of the signals and information related to the signals. Specifically, the terminal selects one of the other terminals based on the reception powers and the related information, and estimates the terminal's own location based on the location of the selected another terminal. For example, the information related to the signals may include a level of a transmission power of each signal, a reception time of each signal, or a distance of each of the other terminals to a base station.

Figure 6:
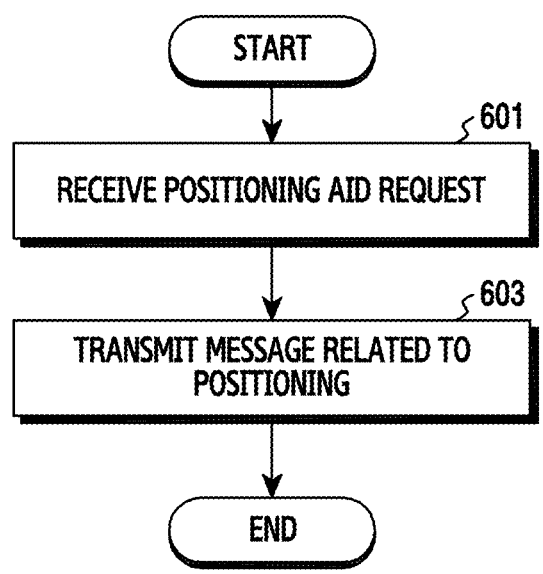
FIG. 6 illustrates an example method for operating of a base station in a wireless communication system according to an exemplary embodiment of the present disclosure.

FIG. 6 illustrates an example method for operating of a base station in a wireless communication system according to an exemplary embodiment of the present disclosure. FIG. 6 illustrates an example of a method for operating of a serving base station of a terminal which performs positioning, for example, of the base station 110.

Referring to FIG. 6, in step 601, the base station receives an aid request regarding positioning. That is, the base station receives a message requesting aid for positioning from a terminal which intends to perform positioning. The message may include a request for providing information necessary for positioning or a request for operating other terminals necessary for positioning.

Next, in step 603, the base station transmits a message related to positioning. The message may include information necessary for positioning or an indication regarding operations of other terminals necessary for positioning. That is, the base station may transmit the message to the terminal which performs positioning or may transmit the message to other terminals which will assist in positioning.

In order to solve a reception power distortion problem caused by power control when the proximity-based positioning technique is applied, not only a D2D signal but also information related to the D2D signal may be used according to various exemplary embodiments. Herein, the information related to the D2D signal includes at least one of a level of a transmission power of a signal, a reception time of a signal, and a distance between another terminal which has transmitted a signal and a base station. That is, the proximity-based positioning technique according to various exemplary embodiments can solve an error in reception power information caused by power control by additionally utilizing other information in addition to reception powers. Hereinafter, detailed embodiments according to the information related to the D2D signal will be described.

Figure 7:
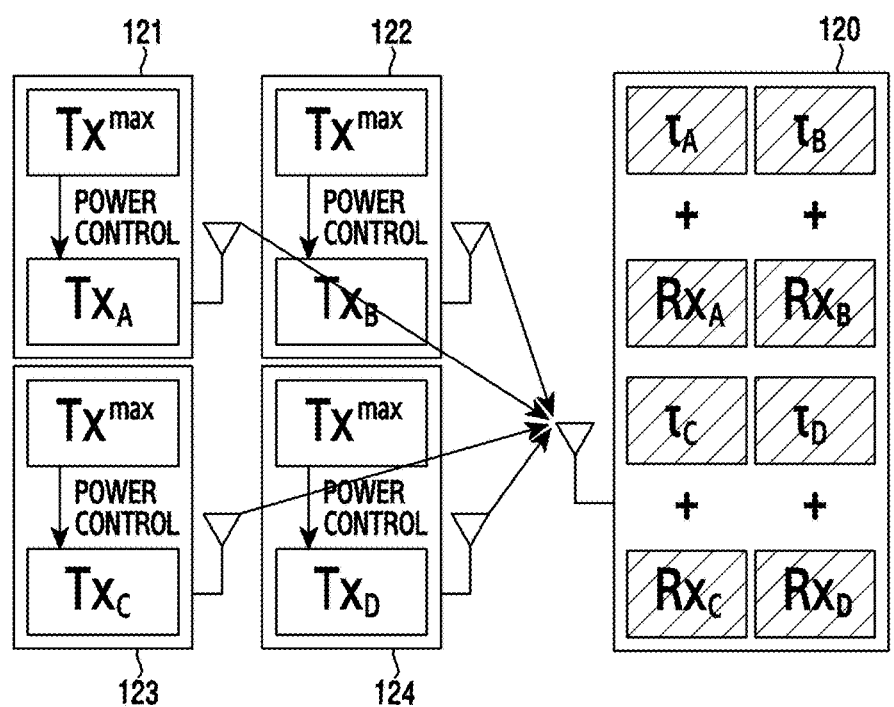
FIG. 7 illustrates an example of positioning using reception times of signals in a wireless communication system according to an exemplary embodiment of the present disclosure.

FIG. 7 illustrates an example positioning using reception times of signals in a wireless communication system according to an exemplary embodiment of the present disclosure. Referring to FIG. 7, a terminal 120 performs positioning by using signals from other terminals 121 to 124. In this case, the other terminals 121 to 124 may use different transmission powers $Tx_A$, $Tx_B$, $Tx_C$, and $Tx_D$ by performing power control. Accordingly, the terminal 120 may reduce an error caused by power control by using reception powers $Rx_A$, $Rx_B$, $Rx_C$, and $Rx_D$ of signal received from the other terminals 121 to 124 and reception time-related information $\tau_A$, $\tau_B$, $\tau_C$, and $\tau_D$.

Figure 8A:
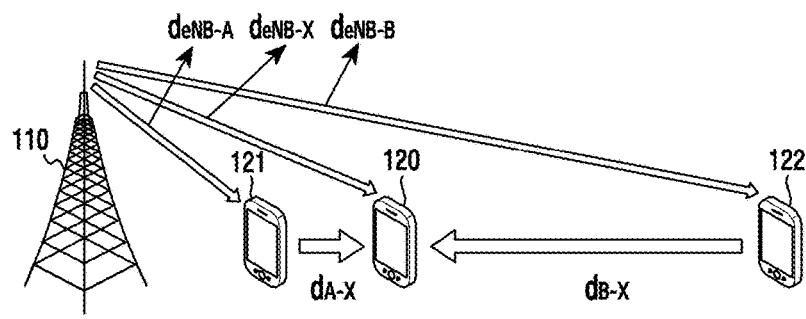
FIGS. 8A and 8B illustrate examples procedure of obtaining time offsets of signals in a wireless communication system according to an exemplary embodiment of the present disclosure.
Figure 8B:
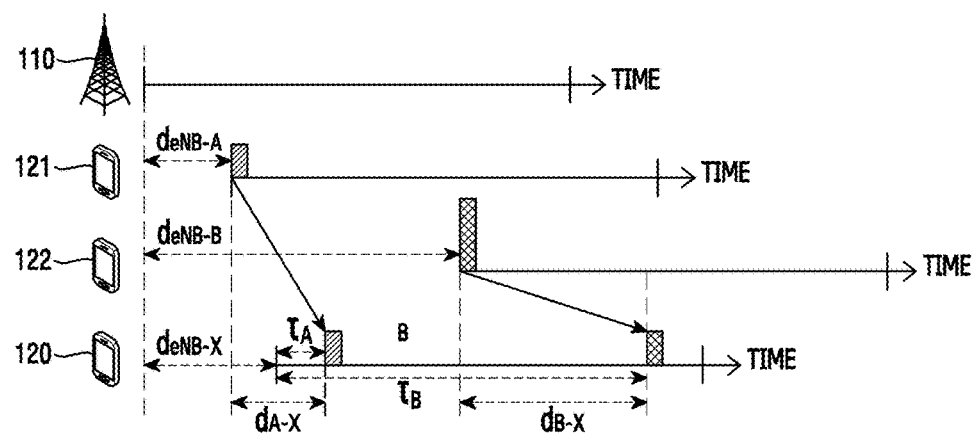

FIGS. 8A and 8B illustrate examples procedure of acquiring time offsets of signals in a wireless communication system according to an exemplary embodiment of the present disclosure. FIGS. 8A and 8B illustrate timings of receiving signals from the terminals 121 to 122 according to distances to the base station 110. FIG. 8A illustrates distances from the base station 110 and FIG. 8B illustrates timings of receiving signals from the terminals 121 and 122.

Referring to FIG. 8A, the terminal 120 is located closer to the base station 110 than the terminal 122, and the terminal 121 is located closer to the base station 110 than the terminal 120. Accordingly, a propagation delay $D_{eNB-B}$ regarding a signal from the base station 110 to the terminal 122 is longer than a propagation delay $D_{eNB-X}$ regarding a signal from the base station 110 to the terminal 120. In addition, the propagation delay $D_{eNB-X}$ is longer than a propagation delay $D_{eNB-A}$ regarding a signal from the base station 110 to the terminal 121. In addition, a distance between the terminal 122 and the terminal 120 is longer than a distance between the terminal 121 and the terminal 120. Accordingly, a propagation delay $D_{B-X}$ regarding a signal from the terminal 122 to the terminal 120 is longer than a propagation delay $D_{A-X}$ regarding a signal from the terminal 121 to the terminal 120.

As shown in FIG. 8A, since distances to the base station 110 are different, reception timings of the signals transmitted from the base station 110 are different, and accordingly, transmission timings of the terminals 121 and 122 are different. In other words, since reception times of downlink signals are different according to distances to the base station 110, the terminals 121 and 122 may have different transmission times of real signals even when the terminal 121 and 122 transmit signals through the same slot of the same frame/subframe. That is, since the terminals 121 and 122 transmit D2D signals by synchronizing with the reception times of the downlink signals of the base station 110, there may be regular time offsets according to relative locations of the terminal 120 and the terminals 121 and 122 to the base station 110. Herein, the time offset refers a difference between the operation time of the terminal 120 and the reception time of the D2D signal.

Referring to FIG. 8B, the terminal 120 receives D2D signals from the terminals 121 and 122. In this case, the time offset of the D2D signal from the terminal 121 is $\tau_A$ and the time offset of the D2D signal from the terminal 122 is $\tau_B$. The length of the time offset cannot exceed the length of one slot. In this case, since the terminal 121 is closer to the base station 110 than the terminal 120, there is a high probability that $\tau_A$ is relatively short. On the other hand, since the terminal 122 is farther from the base station 110 than the terminal 120, there is a high probability that $\tau_B$ is relatively long. That is, as the distance to the terminal 120 is shorter, the length of the time offset is shorter.

Due to the power control, the terminal 121 close to the base station may transmit a signal using a low transmission power and the terminal 122 may transmit a signal using a high transmission power. In this case, a proportional relationship between a reception power of a signal and proximity may break according to which terminal is closer to the terminal 120. For example, when the terminal 120 is close to the base station 110 as shown in FIG. 9A, a proportional relationship between reception powers of signals received from the terminals 121 and 122 and proximity is not always established.

Figure 9A:
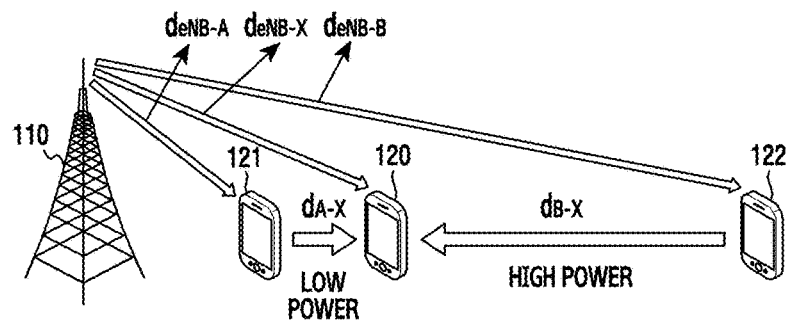
FIGS. 9A and 9B illustrate examples procedure of selecting a close terminal by considering reception times and reception powers of signals in a wireless communication system according to an exemplary embodiment of the present disclosure.
Figure 9B:
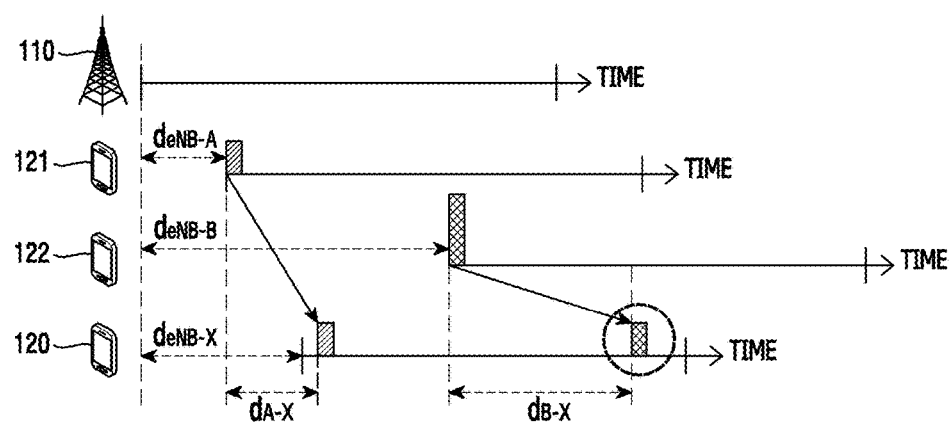

FIGS. 9A and 9B illustrate examples procedure of selecting a close terminal by considering reception times and reception powers of signals in a wireless communication system according to an exemplary embodiment of the present disclosure. FIGS. 9A and 9B illustrate a case in which the terminal 120 is close to the base station 110.

Referring to FIG. 9A, the terminal 120 is located closer to the terminal 121 than to the terminal 122. In addition, the terminal 121 uses a relatively low transmission power and the terminal 122 uses a relatively high transmission power. Referring to time offsets, there is a big difference between the time offset regarding the terminal 121 and the time offset regarding the terminal 122 as shown in FIG. 9B. On the other hand, since the terminal 120 is close to the terminal 121 which uses the low transmission power, there may not be a big difference between the reception power regarding the terminal 121 and the reception power regarding the terminal 122.

Accordingly, when the terminal 120 is located close to the base station 110, it may be difficult to distinguish between the terminals 121 and 122 based on the level of the reception power. On the other hand, it may be relatively easy to distinguish between the terminals 121 and 122 based on the length of the time offset. In this case, the terminal 120 may select the terminal 121 which has the relatively short time offset or has a earlier reception time as a reference terminal for positioning.

Figure 10A:
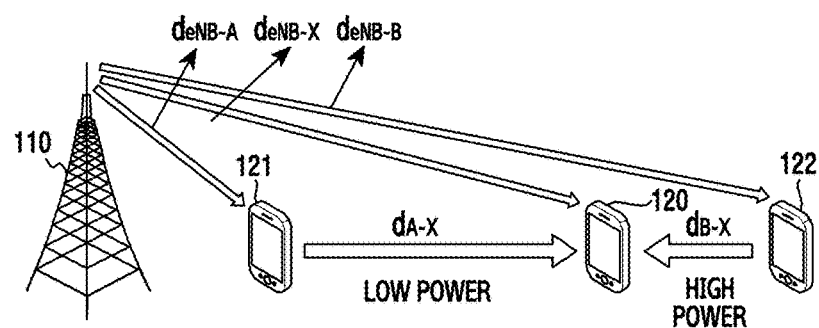
FIGS. 10A and 10B illustrate another examples procedure of selecting a close terminal by considering reception times and reception powers of signals in a wireless communication system according to an exemplary embodiment of the present disclosure.
Figure 10B:
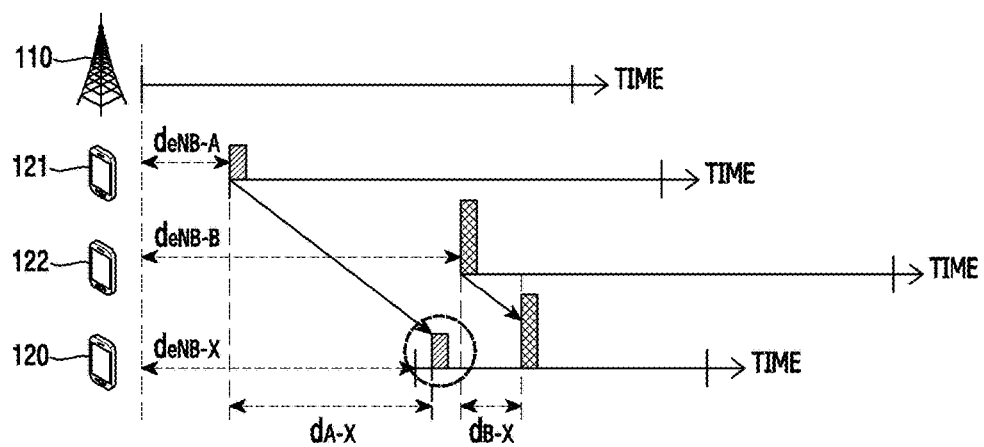

FIGS. 10A and 10B illustrate another example procedure of selecting a close terminal by considering reception times and reception powers of signals in a wireless communication system according to an exemplary embodiment of the present disclosure. FIGS. 10A and 10B illustrate a case in which the terminal 120 is not close to the base station 110.

Referring to FIG. 10A, the terminal 120 is located closer to the terminal 122 than to the terminal 121. In addition, the terminal 121 may use a relatively low transmission power and the terminal 122 may use a relatively high transmission power. Referring to time offsets, as shown in FIG. 10B, there is a small difference between the time offset regarding the terminal 121 and the time offset regarding the terminal 122 in comparison to the case of FIG. 9B. On the other hand, since the terminal 120 is close to the terminal 122 which uses the high transmission power, there is a big difference between the reception power regarding the terminal 121 and the reception power regarding the terminal 122.

Accordingly, when the terminal 120 is located far from the base station 110, it may be difficult to distinguish between the terminals 121 and 122 based on the length of the time offset. On the other hand, it may be relatively easy to distinguish between the terminals 121 and 122 based on the level of the reception power. In this case, the terminal 120 may select the terminal 122 having the relatively high reception power as a reference terminal for positioning.

As described above with reference to FIGS. 9A to 10B, the reliability of information used to determine proximity may vary according to the location of the terminal 120. That is, appropriate information for determining a close terminal varies according to the location of the terminal 120. Specifically, as the terminal 120 is farther from the base station 110, the reception power is the information for exactly determining proximity and, as the terminal 120 is closer to the base station 110, the time offset is the information for exactly determining proximity. Accordingly, according to an exemplary embodiment, the terminal 120 utilizes the reception powers and the reception times of the signals altogether.

Specifically, the terminal 120 measures reception powers and time offsets of signals received from the other terminals (for example, the terminals 121 and 122). The terminal 120 may detect a reception time of a D2D signal by performing a correlation with respect to a reference signal (for example, DM-RS) of the D2D signal, which is received within a D2D signal transmission channel formed of a plurality of slots. In this case, the terminal 120 converts the reception time into a value of a sample unit having a length shorter than the length of one slot by considering a slot period. Thereafter, based on a difference between the reception time which is converted into the sample unit and an operation time of the terminal 120, a time offset having the length of the sample unit is determined. Thereafter, the terminal 120 converts the time offset into a power value. To achieve this, a path loss model may be used. The terminal 120 may modify the reception power using the power valued which is obtained from the time offset. That is, new reception power information reflecting both the measured reception power and the time offset may be acquired. In addition, the terminal 120 selects a terminal having the maximum modified reception power as a reference terminal.

Herein, the reception power may be modified in various methods. For example, the terminal 120 may perform weighted-sum with respect to the measured reception power and a reception power which is obtained from the time offset. The weighted-sum may be performed based on Equation 1 presented below:

$$Rx'_i = w_1 \cdot Rx_i - w_2 \cdot \text{Pathloss}(\tau_i) \qquad \text{Equation 1}$$

In Equation 1, $Rx'_i$ is a modified reception power regarding a terminal i, $w_1$ is a first weight assigned to a measured reception power, $Rx_1$ is a measured reception power regarding the terminal i, $w_2$ is a second weight assigned to a reception power obtained from a time offset, pathloss( ) is a function for changing a time offset to a reception power according to a path loss model, and $\tau_i$ is a time offset regarding the terminal i.

In modifying a reception power based on the weighted-sum, the first weight and the second weight may be determined by considering a cell radius. In addition, the first weight and the second weight may be adaptively changed according to a distance between the terminal 120 and the base station 110. In this case, the first weight and the second weight may be adaptively changed by reflecting reliability of information which changes according to the location of the terminal 120. That is, since information appropriate to the proximity-based positioning is different according to the location of the terminal 120 from the base station 110, the weights may be variably applied according to the location of the terminal 120. For example, the first weight and the second weight may be changed in patterns as shown in FIG. 11.

Figure 11:
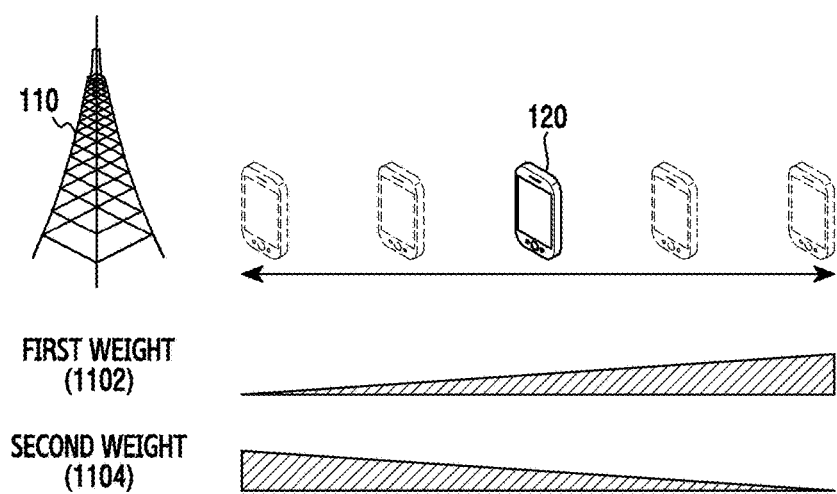
FIG. 11 illustrates an example adaptive changes in weights related to reception times and reception powers of signals in a wireless communication system according to an exemplary embodiment of the present disclosure.

FIG. 11 illustrates examples adaptive changes in weights regarding reception times and reception powers of signals in a wireless communication system according to an exemplary embodiment of the present disclosure. As shown in FIG. 11, as the terminal 120 is closer to the base station 110, time offsets allow to more exactly distinguishing terminals. Therefore, as the terminal 120 is closer to the base station 110, a second weight 1104 to be applied to reception powers obtained from time offsets increases. To the contrary, as the terminal 120 is farther from the base station 110, measured reception powers allow to more exactly distinguishing terminals. Therefore, as the terminal 120 is farther from the base station 110, a first weight 1102 to be applied to the measured reception powers increases.

A distance between the terminal 120 and the base station 110 may be estimated based on a reception power regarding a signal received from the base station 110. Accordingly, the terminal 120 determines proximity to the base station 110 based on the level of a reception power of a downlink signal transmitted from the base station 110, and adjusts the weights 1102 and 1104. Specifically, as the reception power is greater, the terminal 120 may increase a contribution of the time offset by increasing the second weight 1104 and reducing the first weight 1102. To the contrary, as the reception power of the downlink signal transmitted from the base station 110 is smaller, the terminal 120 may increase a contribution of the reception power by reducing the second weight 1104 and increasing the first weight 1102.

Thereafter, the terminal 120 may measure the reception powers and the time offsets of D2D signals received from neighbor terminals, and convert the time offset into a power value based on the path loss model. In addition, the terminal 120 may modify the measured reception power using the converted power value and then may determine the location of a terminal which has transmitted a D2D signal corresponding to the maximum value of the modified reception powers as the terminal 120 own location. As a result, a D2D terminal located close to the terminal 120 may be selected based on the modified reception power.

Figure 12:
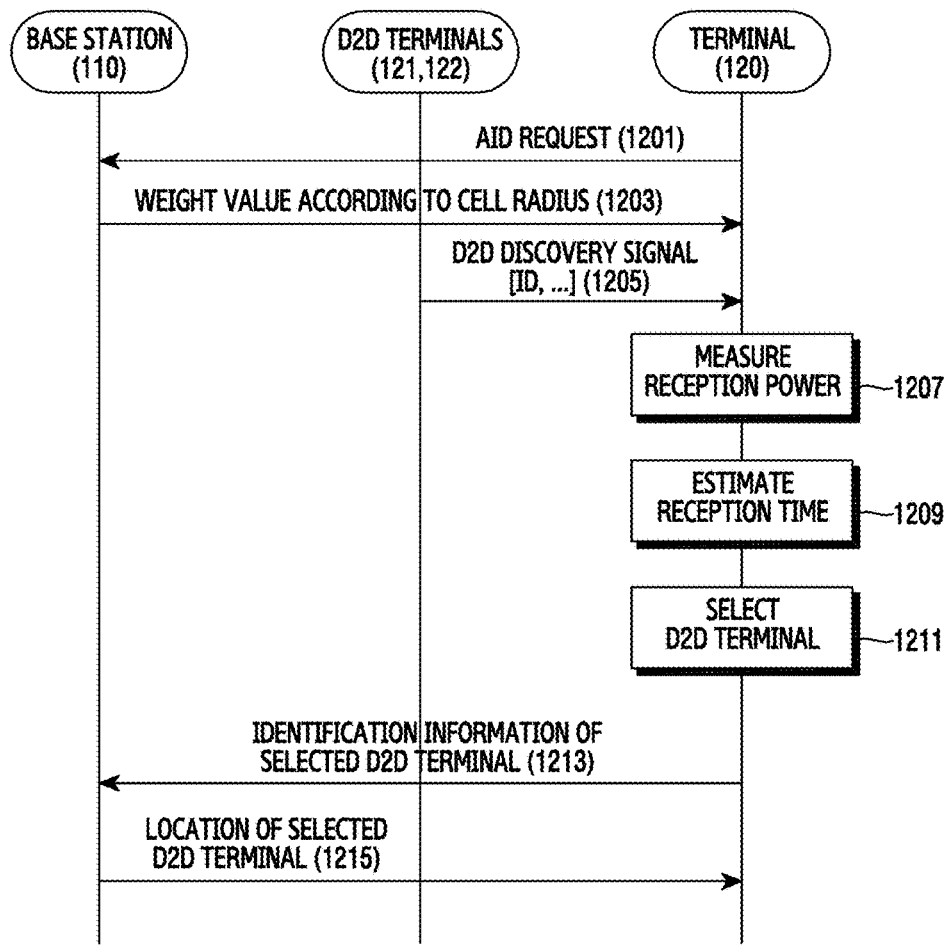
FIG. 12 illustrates an example exchange for positioning by considering reception times in a wireless communication system according to an exemplary embodiment of the present disclosure.

FIG. 12 illustrates an example signal exchange for positioning by considering reception times in a wireless communication system according to an exemplary embodiment of the present disclosure.

Referring to FIG. 12, in step 1201, the terminal 120 transmits an aid request to the base station 110. In other words, the terminal 120 transmits a message requesting aid for positioning to the base station 110.

In step 1203, the base station 110 transmits at least one weight value according to a cell radius to the terminal 120. In other words, the base station 110 transmits, to the terminal 120, information regarding weights (for example, $w_1$, $w_2$) to be applied to a measured reception power and a reception power obtained from a time offset. However, according to another embodiment, the terminal 120 may determine weight values. In this case, the terminal 120 may estimate a distance to the base station 110 based on strength of a downlink signal, and determine weight values based on the distance.

In step 1205, the D2D terminals 121 and 122 transmit D2D discovery signals. Herein, the D2D discovery signals include respective identification information of the D2D terminals 121 and 122. According to another exemplary embodiment, instead of the D2D discovery signal, a D2D communication signal or a D2D synchronization signal may be used or a D2D signal defined for assisting in positioning may be used. In addition, according to another exemplary embodiment, the D2D terminals 121 and 122 may transmit the D2D discovery signals after receiving, from the base station 110, an indication to assist in positioning the terminal 121.

In step 1207, the terminal 120 measures reception powers regarding the D2D discovery signals received from the D2D terminals 121 and 122. The reception power may be measured based on a size of a signal, energy, or the like.

In step 1209, the terminal 120 estimates reception times of the D2D discovery signals received from the D2D terminals 121 and 122. The terminal 120 may detect the reception times by performing a correlation with respect to reference signals included in the D2D discovery signals. In this case, the reception time may be expressed in a sample unit and the terminal 120 may convert the reception time into a time offset.

In step 1211, the terminal 120 selects a D2D terminal which is determined to be the closest terminal thereto using the reception powers and the reception times of the D2D discovery signals. To achieve this, the terminal 120 converts the reception time, that is, the time offset, into a power value. In addition, the terminal 120 modifies the reception power measured in step 1207 using the power valued obtained from the time offset. For example, the terminal 120 may modify the reception power by performing weighted-sum as in Equation 1. Accordingly, modified reception power values corresponding to the D2D terminals 121 and 122 are determined. The terminal 120 may select a terminal that has the maximum modified reception power as the D2D terminal determined to be the closest terminal.

In step 1213, the terminal 120 transmits identification information of the selected D2D terminal to the base station 110. In other words, the terminal 120 transmits a message indicating the D2D terminal which is determined to be the closest terminal.

In step 1215, the base station 110 transmits the location of the selected D2D terminal to the terminal 120. In other words, the base station 110 transmits location information of the D2D terminal indicated by the message received in step 1213.

Figure 13:
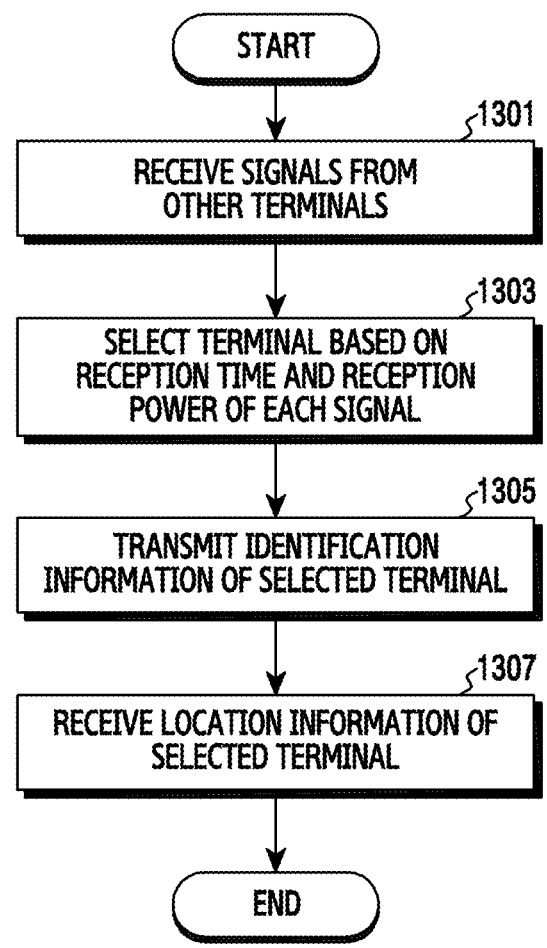
FIG. 13 illustrates an example method for operating of a terminal which performs positioning by considering reception times in a wireless communication system according to an exemplary embodiment of the present disclosure.

FIG. 13 illustrates an example method for operating of a terminal which performs positioning by considering reception times in a wireless communication system according to an exemplary embodiment of the present disclosure. FIG. 13 illustrates a method for operating of the terminal 120.

Referring to FIG. 13, in step 1301, the terminal receives signals from other terminals. Herein, the other terminals are terminals performing D2D communication and their locations are known to the base station. The signal is a D2D signal and may be one of a D2D discovery signal, a D2D communication signal, a D2D synchronization signal, and a signal defined for assisting in positioning.

Next, in step 1303, the terminal selects one of the other terminals based on a reception time and a reception power of each signal. To achieve this, the terminal may convert the reception time into a power value, and determine a reception power modified for each signal by performing weighted-sum with respect to the power value and the reception power. In addition, the terminal selects another terminal which has transmitted a signal having the maximum modified reception power.

Thereafter, in step 1305, the terminal transmits identification information of the selected terminal. In other words, the terminal requests location information of the selected terminal from the base station. Herein, the identification information may be identified from the signals received in step 1301.

In step 1307, the terminal receives the location information of the selected terminal. That is, the terminal receives the location information of another terminal which is determined to be the closest terminal. Accordingly, the terminal completes positioning.

Figure 14:
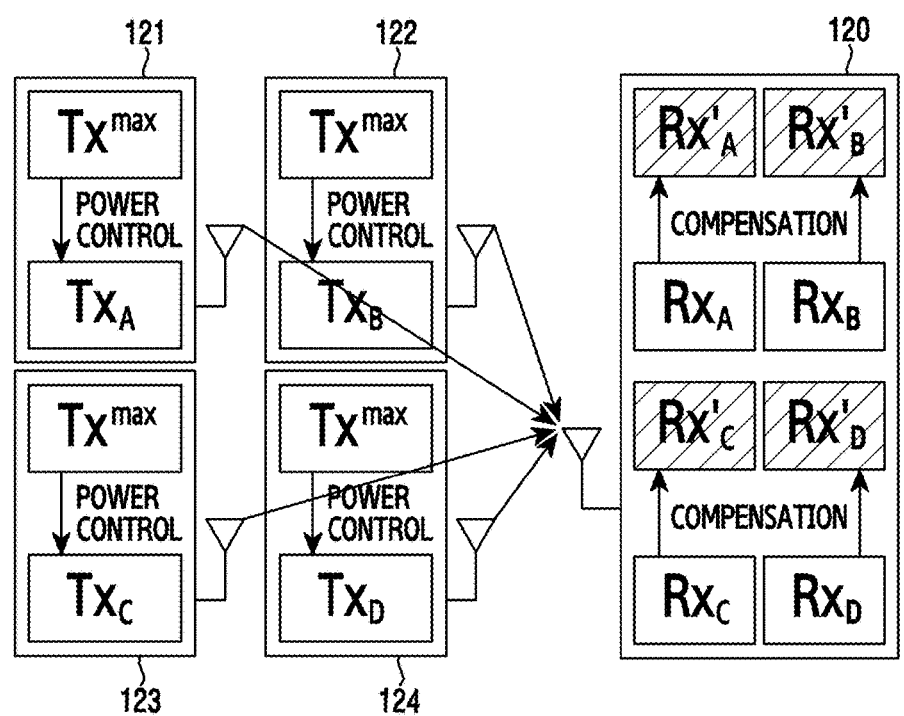
FIG. 14 illustrates an example concept of positioning using transmission powers of signals in a wireless communication system according to one embodiment of the present disclosure.

FIG. 14 illustrates an example positioning using transmission powers of signals in a wireless communication system according to an exemplary embodiment of the present disclosure. Referring to FIG. 14, a terminal 120 performs positioning using signals from other terminals 121 to 124. In this case, the other terminals 121 to 124 may use different transmission powers $Tx_A$, $Tx_B$, $Tx_C$, and $Tx_D$ by performing power control. Accordingly, the terminal 120 may calculate compensated reception powers $Rx'_A$, $Rx'_B$, $Rx'_C$, and $Rx'_D$ by compensating reception powers $Rx_A$, $Rx_B$, $Rx_C$, and $Rx_D$ of signals received from the other terminals 121 to 124. In addition, the terminal 120 may reduce an error caused by power control by using the compensated reception powers $Rx'_A$, $Rx'_B$, $Rx'_C$, and $Rx'_D$. That is, according to the embodiment shown in FIG. 14, all of the reception powers, the transmission powers, and the maximum transmission power are considered.

Figure 15A:
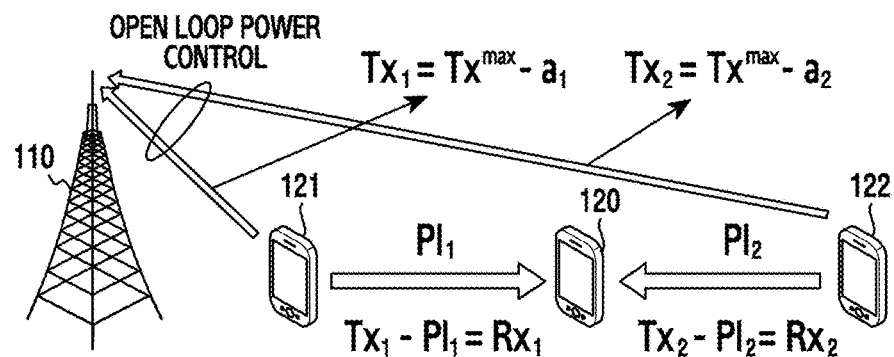
FIGS. 15A and 15B illustrate examples procedure of selecting a close terminal considering transmission powers and reception powers of signals in a wireless communication system according to an exemplary embodiment of the present disclosure.
Figure 15B:
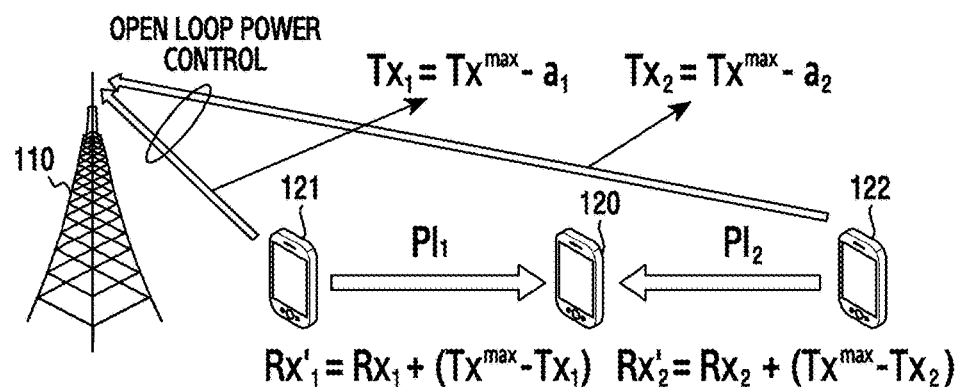

FIGS. 15A and 15B illustrate examples selecting a close terminal by considering transmission powers and reception powers of signals in a wireless communication system. FIG. 15A illustrates measured reception powers and FIG. 15B illustrate compensated reception powers.

Referring to FIG. 15A, according to power control, the terminal 121 uses a transmission power $Tx_1$ which is reduced from a maximum transmission power $Tx^{max}$ by $a_1$, and the terminal 122 uses a transmission power $Tx_2$ which is reduced from the maximum transmission power $Tx^{max}$ by $a_2$. In this case, since the terminal 121 is closer to the base station 110 than the terminal 122, $a_1$ is larger than $a_2$, and as a result, $Tx_2$ is greater than $Tx_1$. Reception powers $Rx_1$ and $Rx_2$ measured by the terminal 120 are smaller than the transmission powers $Tx_1$ and $Tx_2$ by path loss values $Pl_1$ and $Pl_2$, respectively. Accordingly, since a proportional relationship between a reception power and proximity is not be guaranteed due to the difference in the transmission powers, compensation is performed by considering the transmission powers and the maximum transmission power as shown in FIG. 15B.

Referring to FIG. 15B, the terminal 120 identifies the transmission powers $Tx_1$ and $Tx_2$ using D2D signals received from the terminals 121 and 122. According to an exemplary embodiment, when the wireless communication system conforms to the 3GPP standard, the maximum transmission power is defined as 23 dBm and is information which is known in advance. That is, the terminal 120 may know both the transmission powers and the maximum transmission power of the terminals 121 and 122. Accordingly, the terminal 120 may calculate a power value $\alpha_i$ which is reduced by open loop power control. In addition, the terminal 120 compensates the reception power for the reduced power value. For example, the terminal 120 may compensate the reception power as shown in Equation 2 presented below:

$$Rx'_i = Rx_i + (Tx^{max} - Tx_i) \qquad \text{Equation 2}$$

In Equation 2, $Rx'_i$ is a compensated reception power regarding a terminal i, $Rx_i$ is a measured reception power regarding the terminal i, $Tx^{max}$ is a maximum transmission power, $Tx_i$ is a transmission power of the terminal i. Herein, $Rx'_i$ refers to a reception power which is measured on the assumption that the terminal i uses the maximum transmission power.

When the modified reception powers $Rx'_1$ and $Rx'_2$ regarding the terminals 121 and 122 are determined, the terminal 120 selects a terminal which has the maximum modified reception power as the closest terminal, that is, a reference terminal.

As described above, the terminal 120 can exactly compensate a reception power which is distorted by open loop power control by using the transmission power information. Accordingly, similar performance to that which is achieved in an environment in which the terminals 121 and 122 use the same transmission power (for example, the maximum transmission power) can be achieved. To satisfy this condition, the terminals 121 and 122 may transmit information regarding the transmission powers. According to an exemplary embodiment, when the wireless communication systems conforms to the 3GPP standard, the information regarding the transmission powers may be transmitted through a physical sidelink control channel (PSCCH) or a physical sidelink shared channel (PSSCH) contained in a D2D communication signal.

Figure 16:
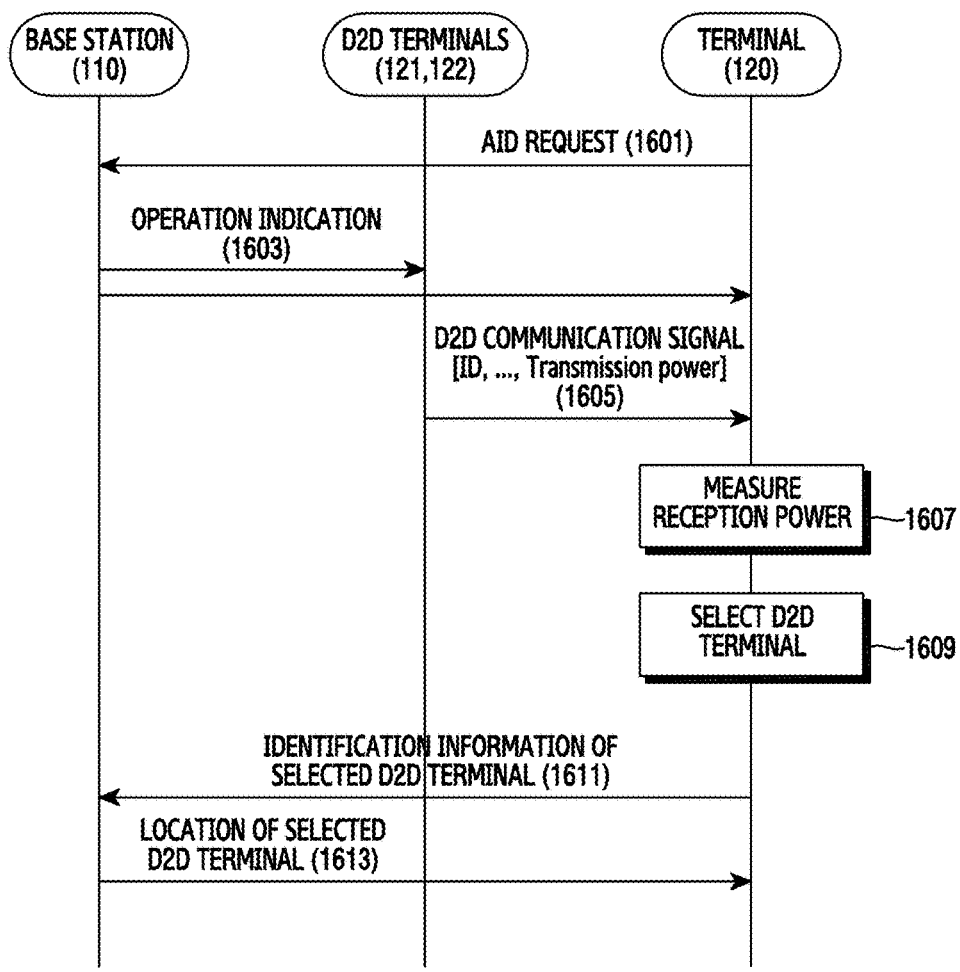
FIG. 16 illustrates an example signal exchange for positioning by considering transmission powers in a wireless communication system according to an exemplary embodiment of the present disclosure.

FIG. 16 illustrates an example signal exchange for positioning by considering transmission powers in a wireless communication system according to an exemplary embodiment of the present disclosure.

Referring to FIG. 16, in step 1601, the terminal 120 transmits an aid request to the base station 110. In other words, the terminal 120 transmits, to the base station 110, a message requesting aid for positioning. According to another exemplary embodiment, the aid request may be transmitted to the terminals 121 and 122 using D2D signals. In this case, subsequent step 1603 may be omitted.

In step 1603, the base station 110 transmits an operation indication to the D2D terminals 121 and 122. In other words, the base station 110 transmits, to the D2D terminals 121 and 122, a message instructing to assist in positioning the terminal 120. Specifically, the base station 110 instructs the D2D terminals 121 and 122 to transmit D2D signals including transmission power information.

In step 1605, the D2D terminals 121 and 122 transmit D2D communication signals. Herein, the D2D communication signal includes identification information and transmission power information of each of the D2D terminals 121 and 122. According to another exemplary embodiment, instead of the D2D communication signal, a D2D discovery signal or a D2D synchronization signal may be used, or a D2D signal defined for assisting in positioning may be used.

In step 1607, the terminal 120 measures reception powers regarding the D2D communication signals received from the D2D terminals 121 and 122. The reception power may be measured based on a size of a signal, energy, or the like.

In step 1609, the terminal 120 may select a D2D terminal that is determined to be the closest terminal by using the reception powers of the D2D communication signals, the transmission powers, and the maximum transmission power of the D2D terminals 121 and 122. To achieve this, the terminal 120 may determine power values which are reduced by power control of the D2D terminals 121 and 122 using the transmission powers and the maximum transmission power, and may compensate the reception powers measured in step 1607 as much as the reduced power values. In addition, the terminal 120 selects a terminal which has the maximum compensated reception power as a D2D terminal determined to be the closest terminal.

In step 1611, the terminal 120 transmits identification information of the selected D2D terminal to the base station 110. In other words, the terminal 120 transmits a message indicating the D2D terminal which is determined to be the closest terminal.

In step 1613, the base station 110 transmits the location of the selected D2D terminal to the terminal 120. In other words, the base station 110 transmits the location information of the D2D terminal indicated by the message received in step 1611.

Figure 17:
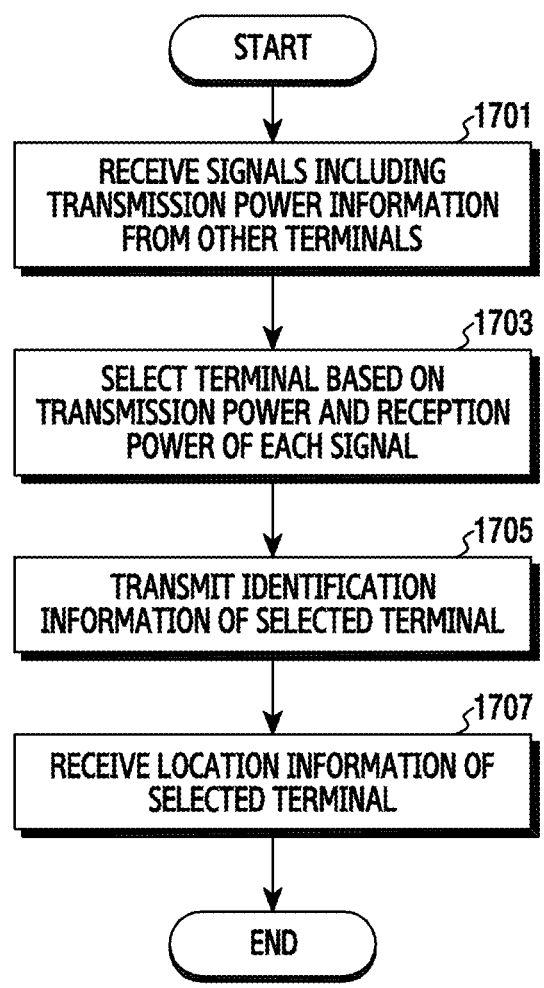
FIG. 17 illustrates an example method for operating of a terminal which performs positioning by considering transmission powers in a wireless communication system according to an exemplary embodiment of the present disclosure.

FIG. 17 illustrates an example method for operating of a terminal which performs positioning by considering transmission powers in a wireless communication system according to an exemplary embodiment of the present disclosure. FIG. 17 illustrates an example of a method for operating of the terminal 120.

Referring to FIG. 17, in step 1701, the terminal receives signals including transmission power information from other terminals. Herein, the other terminals are terminals capable of performing D2D communication and their locations are already known to the base station. The signal is a D2D signal and may be one of a D2D discovery signal, a D2D communication signal, a D2D synchronization signal, and a signal defined for assisting in positioning.

Next, in step 1703, the terminal selects one terminal based on transmission powers and reception powers of the signals. To achieve this, the terminal may determine power values which are reduced by power control by using the maximum transmission power and the reception powers, and may compensate the reception powers using the reduced power values. In addition, the terminal selects another terminal which has transmitted a signal having the maximum compensated reception power.

Thereafter, in step 1705, the terminal transmits identification information of the selected terminal. In other words, the terminal requests the location information of the selected terminal from the base station. Herein, the identification information may be identified from the signals received in step 1701.

In step 1707, the terminal receives the location information of the selected terminal. That is, the terminal receives the location information of another terminal which is determined to be the closest terminal. Accordingly, the terminal completes positioning.

Figure 18:
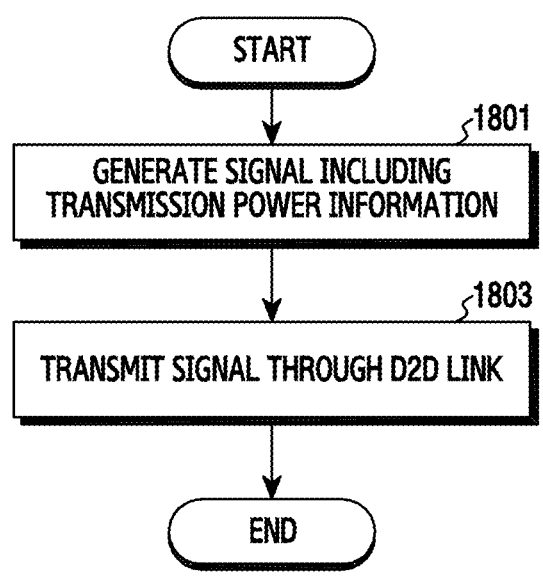
FIG. 18 illustrates an example method for operating of a terminal which assists in positioning by considering transmission powers in a wireless communication system according to an exemplary embodiment of the present disclosure.

FIG. 18 illustrates an example method for operating of a terminal which assists in positioning by considering transmission powers in a wireless communication system according to an exemplary embodiment of the present disclosure. FIG. 18 illustrates an example of a method for operating of the terminal 121 or the terminal 122.

Referring to FIG. 18, in step 1801, the terminal generates a signal including transmission power information. In this case, the terminal may generate the signal including the transmission power information in response to a request or indication being received from a base station or a terminal which performs positioning. The signal is a D2D signal and may be one of a D2D discovery signal, a D2D communication signal, a D2D synchronization signal, and a signal defined for assisting in positioning.

Thereafter, in step 1803, the terminal transmits the signal through a D2D link. That is, the terminal transmits the signal through the D2D link, that is, a direct link, such that neighbor terminals receive the signal.

Figure 19:
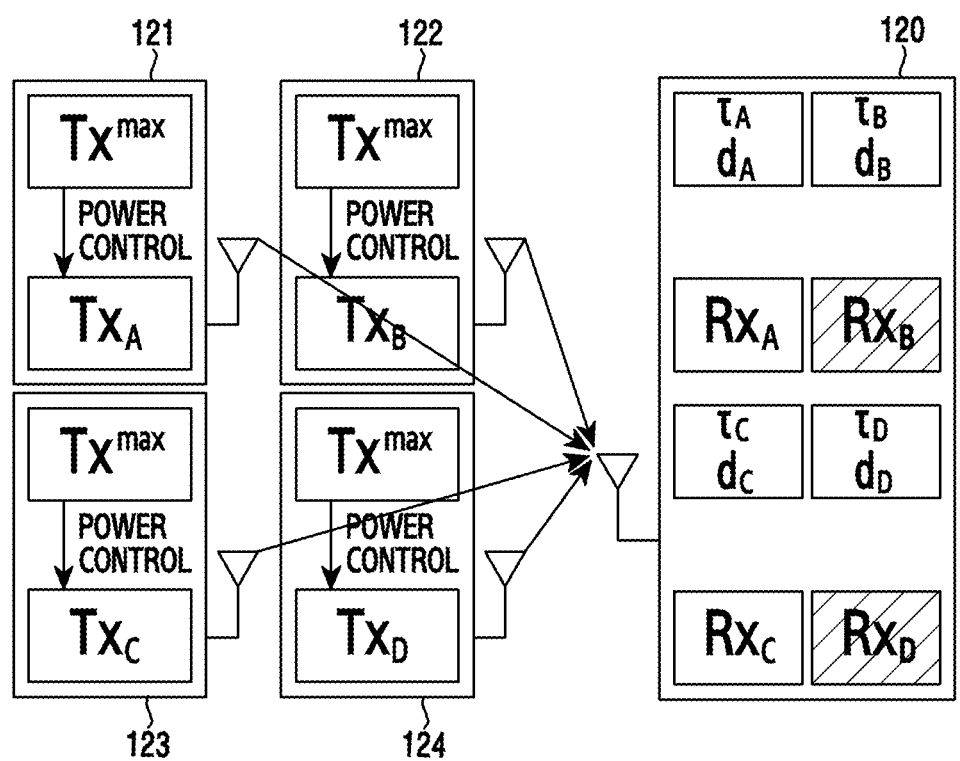
FIG. 19 illustrates an example concept of limiting a candidate group of neighbor terminals for positioning in a wireless communication system according to an exemplary embodiment of the present disclosure.

FIG. 19 illustrates an example limiting a candidate group of neighbor terminals for positioning in a wireless communication system according to an exemplary embodiment of the present disclosure. FIG. 19 illustrates an embodiment of limiting a D2D terminal candidate group for comparing reception powers based on reception times of D2D signals and distance information between a D2D terminal and a base station. Referring to FIG. 19, the terminal 120 performs positioning using signals from other terminals 121 to 124. In this case, the other terminals 121 to 124 may use different transmission powers $Tx_A$, $Tx_B$, $Tx_C$, and $Tx_D$ by performing power control. In this case, the terminal 120 may limit a candidate group by using reception powers $Rx_A$, $Rx_B$, $Rx_C$, and $Rx_D$ of signals received from the other terminals 121 to 124, reception time-related information $\tau_A$, $\tau_B$, $\tau_C$, and $\tau_D$, and distance information $d_A$, $d_B$, $d_C$, and $d_D$ to the base station.

Figure 20:
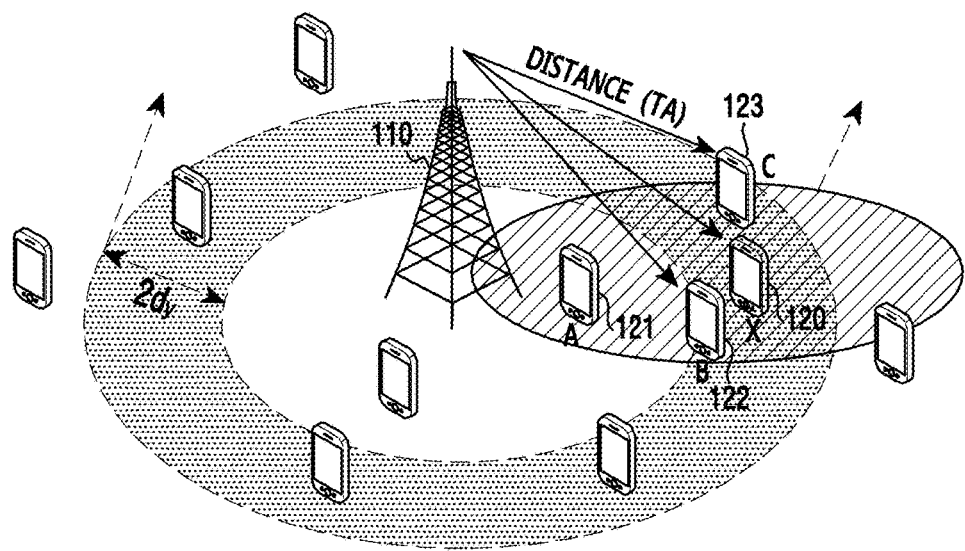
FIG. 20 illustrates an example procedure of determining a candidate group of neighbor terminals for positioning in a wireless communication system according to an exemplary embodiment of the present disclosure.

FIG. 20 illustrates an example determining a candidate group of neighbor terminals for positioning in a wireless communication system according to an exemplary embodiment of the present disclosure. FIG. 20 illustrates an example of distribution of terminals within coverage of the base station 110. Referring to FIG. 20, there exists a plurality of terminals within the coverage of the base station 110. In this case, the candidate group may be limited to terminals located in the proximity of the terminal 120 which performs positioning.

Figure 21:
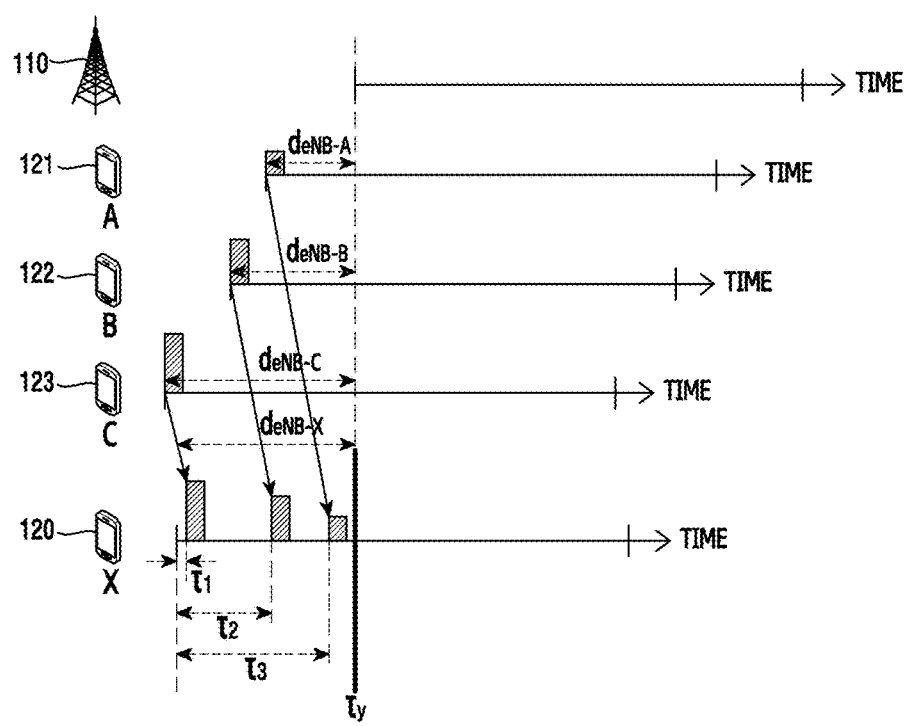
FIG. 21 illustrates an example time at which a signal is received from each neighbor terminal in a wireless communication system according to an exemplary embodiment of the present disclosure.

FIG. 21 illustrates examples times of receiving signals from neighbor terminals in a wireless communication system according to an exemplary embodiment of the present disclosure. Referring to FIG. 21, the time offsets regarding the terminals 121 to 123, which are relatively close to the terminal 120, are shorter than the time offset regarding the base station 110. Based on this, the terminal 120 may determine that the terminals 121 to 123 are located within a predetermined range from the terminal 120. Accordingly, the candidate group may be primarily limited according to the time offsets. Specifically, to limit the candidate group, the terminal 120 selects the terminals 121 to 123, first, in an ascending order of the time offsets of measured D2D signals.

Additionally, to further limit the candidate group, terminals which do not have similar distances to the base station 110 may be excluded. That is, the terminal 120 may limit the candidate group once again based on distances between the other terminals 121 to 122 and the base station 110. In the case of FIG. 20, since the distance between the base station 110 and each of the terminals 122 and 123 is similar to the distance between the terminal 120 and the base station 110, the terminals 122 and 123 are selected as a final candidate group from among the terminals 121 to 123.

In other words, the terminal 120 discovers terminals which have relatively short time offsets and discovers terminals which have similar distances to the base station 110. Accordingly, as shown in FIG. 20, the terminals 122 and 123 which satisfy the two conditions are included in the candidate group. Since the D2D terminal candidate group for comparing reception powers is limited to terminals located in the proximity of the terminal 120 according to a time off-based region 2010 and a base-terminal distance-based region 2012, a positioning error caused by open loop power control may be reduced. To satisfy this, the terminals 121 to 123 may provide information regarding distances to the base station 110. According to an exemplary embodiment, when the wireless communication system conforms to the 3GPP standard, the information on the distances may be transmitted through a PSCCH or a PSSCH in the D2D communication signal.

When the candidate group is determined, the terminal 120 selects one terminal which is determined to be the closest terminal from among the neighbor terminals included in the candidate group. In this case, the terminal 120 may select a reference terminal based on the reception power. Furthermore, the terminal 120 may additionally utilize modification/compensation of the reception powers using the above-described reception times or transmission powers.

Figure 22:
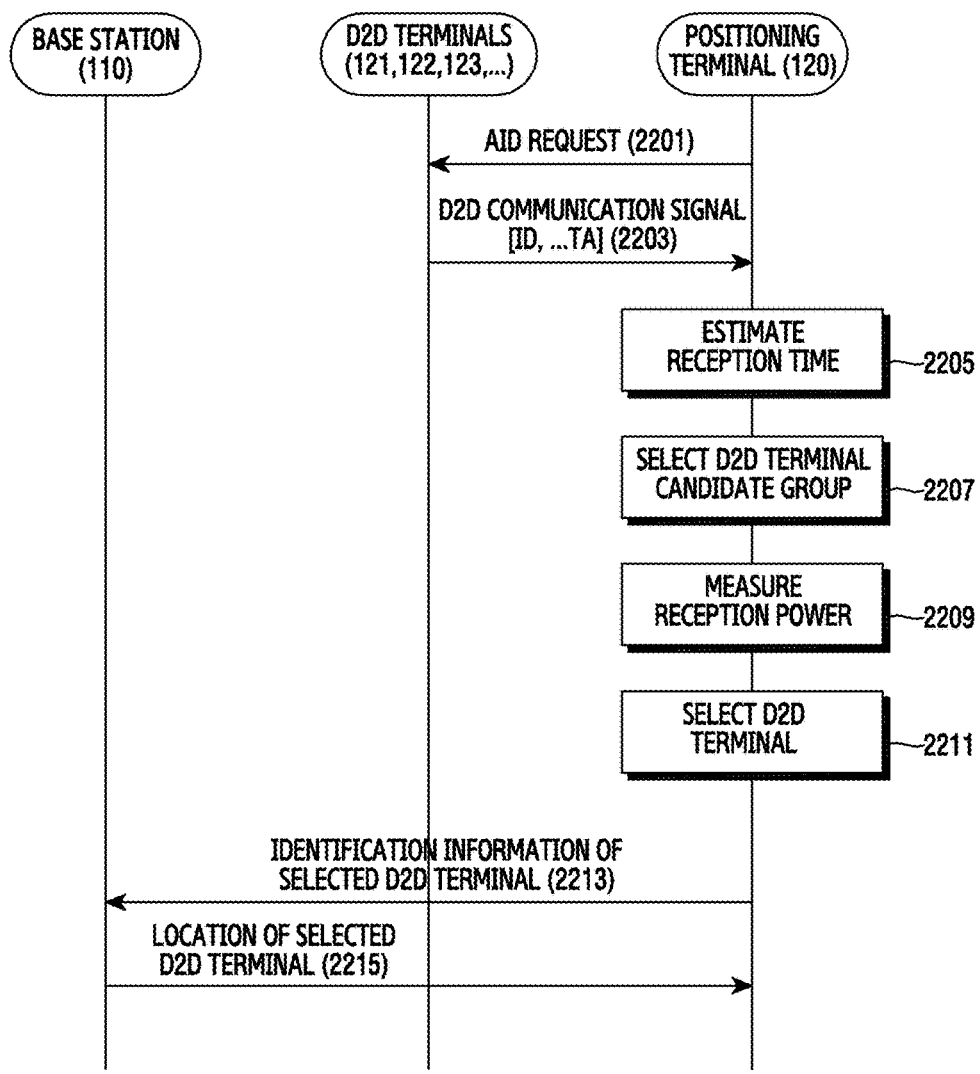
FIG. 22 illustrates an example signal exchange for positioning by using a candidate group in a wireless communication system according to an exemplary embodiment of the present disclosure.

FIG. 22 illustrates an example signal exchange for positioning using a candidate group in a wireless communication system according to an exemplary embodiment of the present disclosure.

Referring to FIG. 22, in step 2201, the terminal 120 transmits an aid request to a plurality of terminals including D2D terminals 121 to 123. In other words, the terminal 120 transmits a message requesting aid for positioning to neighbor terminals. The aid request may be transmitted to the terminals 121 and 122 using D2D signals. According to another exemplary embodiment, the terminal 120 may transmit the aid request to the base station 110. In this case, the base station 110 may transmit a message instructing to assist in positioning to the terminals.

In step 2203, each of the plurality of D2D terminals including the D2D terminals 121 to 123 transmit a D2D communication signal. Herein, the D2D communication signal includes identification information and distance-related information of each of the D2D terminals 121 to 123. For example, the distance-related information may be timing advance (TA). The TA is control information used for adjusting a transmission timing of a terminal, and is transmitted to a terminal during a network accessing procedure. Accordingly, since the D2D terminals 121 to 123 already own TA information, the TA may be included in the D2D communication signals. According to another exemplary embodiment, instead of the D2D communication signal, a D2D discovery signal or a D2D synchronization signal may be used or a D2D signal defined for assisting in positioning may be used.

In step 2205, the terminal 120 estimates reception times of the D2D discovery signals received from the D2D terminals 121 to 123. The terminal 120 may detect the reception time by performing a correlation operation with respect to a reference signal included in the D2D discovery signal. In this case, the reception time may be expressed by a sample unit and the terminal 120 may convert the reception time into a time offset.

In step 2207, the terminal 120 selects a candidate group of D2D terminals to be selected for positioning based on the reception times and the distance-related information. In other words, the terminal 120 limits the candidate group, that is, limits a range of selectable D2D terminals, by using the TA values of the D2D terminals 121 to 123 which are received in step 2203, and the time offsets regarding the D2D terminals 121 to 123 which are estimated in step 2205. In this case, the present embodiment assumes that the D2D terminals 122 and 123 are selected.

In step 2209, the terminal 120 measures reception powers regarding the D2D communication signals received from the D2D terminals 122 and 123. The reception power may be measured based on a size of a signal, energy, or the like.

In step 2211, the terminal 120 selects a D2D terminal which is determined to be the closest terminal using the reception powers of the D2D communication signals. That is, the terminal 120 selects a terminal which has the maximum reception power as the D2D terminal determined to be the closest terminal. According to another exemplary embodiment, the terminal 120 may select the D2D terminal based on the transmission powers of the D2D terminals 122 and 123 and time offsets regarding the D2D terminals 122 and 123.

In step 2213, the terminal 120 transmits identification information of the selected D2D terminal to the base station 110. In other words, the terminal 120 transmits a message indicating the D2D terminal which is determined to be the closest terminal.

In step 2215, the base station 110 transmits the location of the selected D2D terminal to the terminal 120. In other words, the base station 110 transmits the location information of the D2D terminal indicated by the message received in step 2213.

Figure 23:
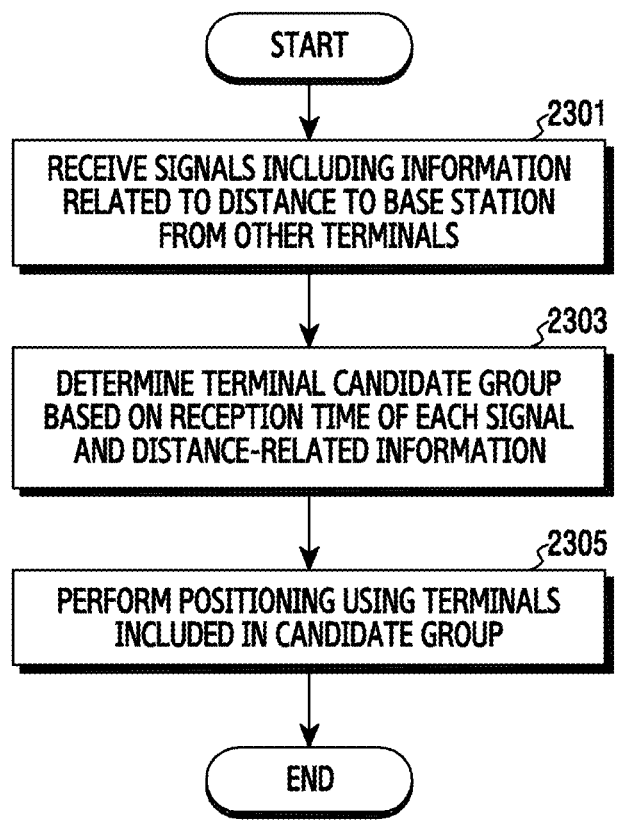
FIG. 23 illustrates an example method for operating of a terminal which performs positioning by using a candidate group in a wireless communication system according to an exemplary embodiment of the present disclosure.

FIG. 23 illustrates an example method for operating of a terminal which performs positioning using a candidate group in a wireless communication system according to an exemplary embodiment of the present disclosure. FIG. 23 illustrates an example of a method for operating of the terminal 120.

Referring to FIG. 23, in step 2301, the terminal receives signals including information distances to a base station from other terminals. Herein, the distance-related information may be TA values of the other terminals.

Next, in step 2303, the terminal determines a terminal candidate group based on reception times of the signals and distance-related information. That is, the terminal measures reception times of the signals received in step 2301 and identifies distance-related information included in the signals. In addition, the terminal selects some of the terminals primarily using the reception times of the signals, and determines a final candidate group from some of the selected terminals based on the distance-related information. Specifically, the terminal selects some of the terminals which have smaller time offsets than the time offset for the base station and includes, in the candidate group, at least one terminal which has transmitted TA of a similar value to that of the TA of the terminal. In other words, the terminal includes, in the candidate group, at least one terminal which has TA having a difference from the TA of the terminal by a threshold value or less.

Thereafter, in step 2305, the terminal performs positioning using the terminals included in the candidate group. That is, the terminal measures reception powers of the signals received in step 2301, and selects another terminal which has the maximum reception power as a reference terminal. The terminal requests a location of the reference terminal from the base station and receives the location of the reference terminal. In this case, according to another exemplary embodiment, time offsets or transmission powers may further be used in addition to the reception powers.

As described above, the terminal 120 uses the reception power of the D2D signal to perform positioning. In this case, according to various exemplary embodiments, the terminal 120 may modify the reception powers using the reception times, compensate the reception powers using the transmission powers, or limit the range of selectable terminals. The present disclosure describes exemplary embodiments separately, but the above-described embodiments may be selectively implemented according to a situation. In this case, the operations of the terminal are shown in FIGS. 24 and 25.

Figure 24:
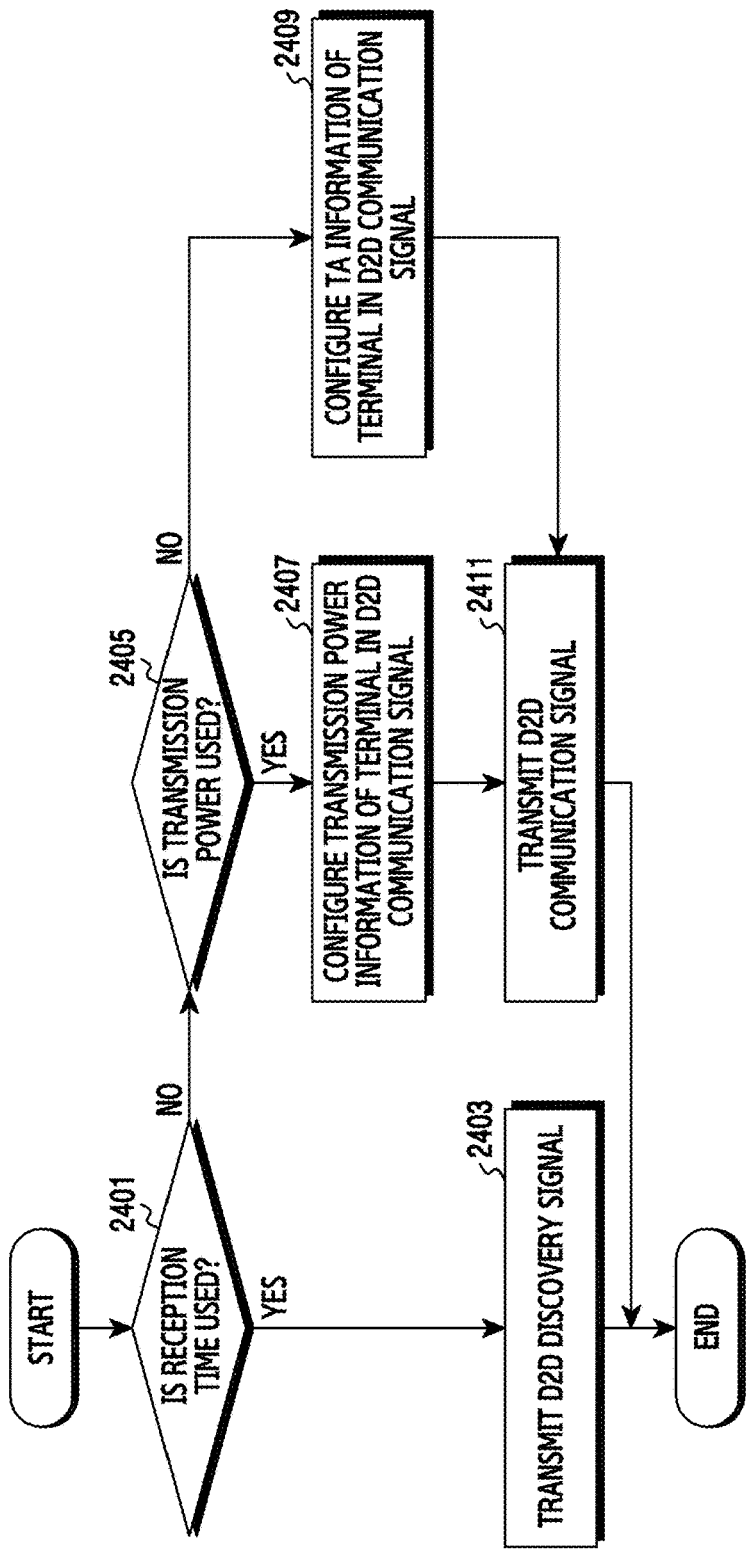
FIG. 24 illustrates an example method for operating of a terminal which assists in positioning in a wireless communication system according to an exemplary embodiment of the present disclosure.
Figure 25:
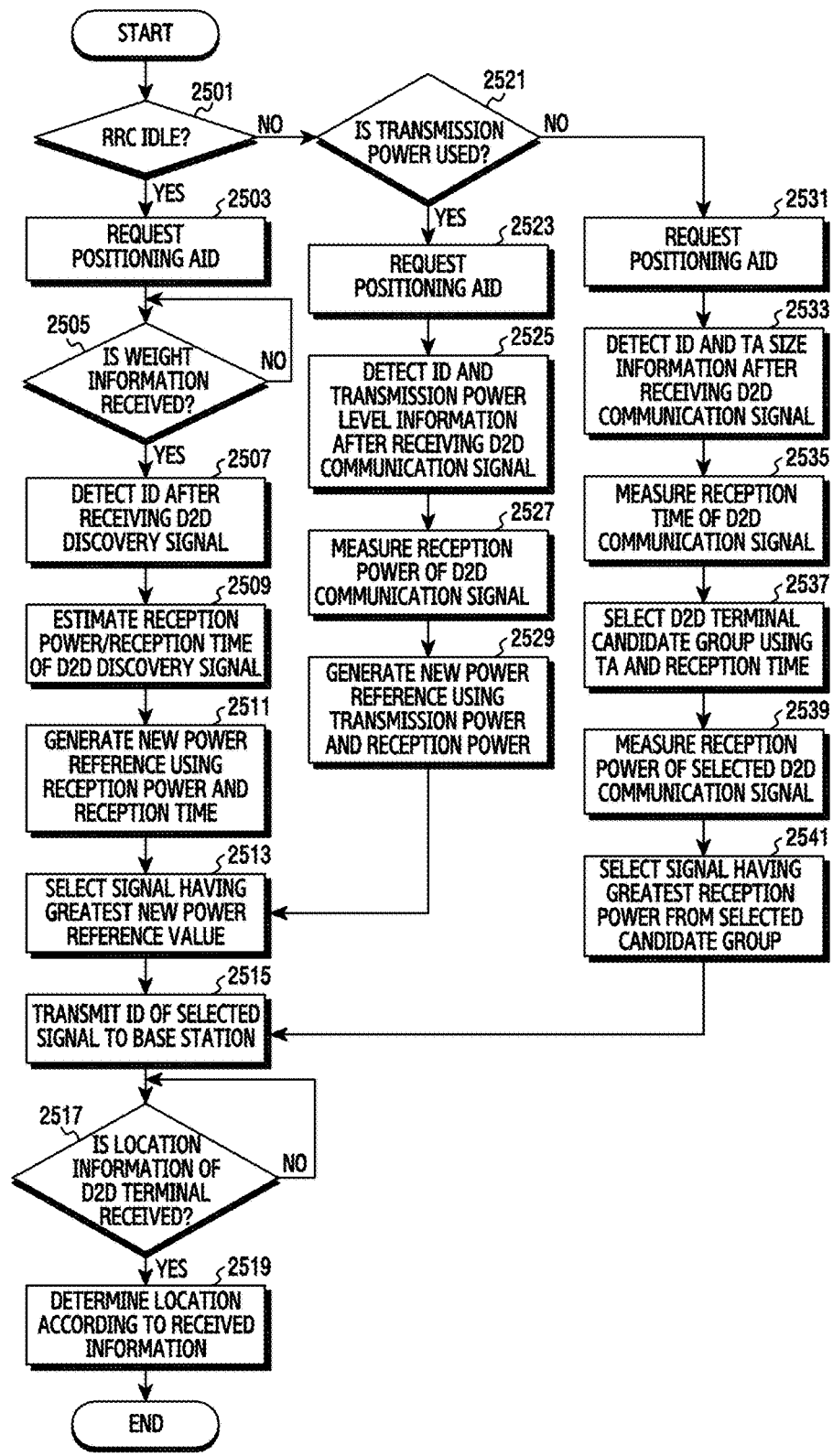
FIG. 25 illustrates an example method for operating of a terminal which performs positioning in a wireless communication system according to an exemplary embodiment of the present disclosure.

FIG. 24 illustrates an example method for operating of a terminal which assists in positioning in a wireless communication system according to an exemplary embodiment of the present disclosure. FIG. 24 illustrates an example of a method for operating of the terminal 121 or the terminal 122. However, some of the operation steps described with reference to FIG. 24 may be omitted according to various exemplary embodiments.

Referring to FIG. 24, in step 2401, the terminal determines whether a terminal (for example, the terminal 120) performing positioning uses reception times or not. For example, it may be determined whether the reception times are used or not through a received aid request or operation indication. When it is determined that the reception times are used, the terminal proceed to step 2403 to transmit a D2D discovery signal.

On the other hand, when it is determined that the reception times are not used, the terminal proceeds to step 2405 to determine whether the terminal (for example, the terminal 120) performing positioning uses transmission powers or not. For example, it may be determined whether the transmission powers are used or not through a received aid request or operation indication. When the aid request or the operation indication includes an indication instructing to transmit information regarding a transmission power, the terminal determines that the transmission powers are used.

When the transmission powers are used, the terminal proceeds to step 2407 to configure transmission power information of the terminal in a D2D communication signal. In addition, the terminal proceeds to subsequent step 2411. On the other hand, when the transmission powers are not used, the terminal proceeds to step 2409 to configure TA information of the terminal in the D2D communication signal. Thereafter, the terminal transmits the D2D communication signal in step 2411.

FIG. 25 illustrates an example method for operating of a terminal which performs positioning in a wireless communication system according to an exemplary embodiment of the present disclosure. FIG. 25 illustrates an example of a method for operating of the terminal 120. However, according to various exemplary embodiments, some of the operation steps described with reference to FIG. 25 may be omitted.

Referring to FIG. 25, in step 2501, the terminal determines whether the terminal is in a radio resource control (RRC) idle state or not. Since the terminal cannot receive a D2D communication signal in the RRC idle state, a positioning method to be used may vary according to whether the terminal is in the RRC idle state or not.

When the terminal is in the RRC idle state, the terminal proceeds to step 2503 to transmit an aid request for positioning to a base station. Thereafter, in step 2505, the terminal determines whether weight information is received or not. The weight information includes weight values to be applied to reception powers measured to be modified and to reception powers obtained from reception times. When the weight information is received, the terminal proceeds to step 2507 to receive D2D discovery signals and then detect identification information included in the D2D discovery signals. Next, in step 2509, the terminal estimates reception powers and reception times regarding the D2D discovery signals. In addition, in step 2511, the terminal generates a new power reference using the reception powers and the reception times. In other words, the terminal converts the reception times into power values and calculates modified reception powers by performing weighted-sum with respect to the reception powers and the power values. Next, in step 2513, the terminal selects a signal which has the maximum new power reference value. In other words, the terminal identifies a signal which has the maximum modified reception power from among the plurality of signals received in step 2507. Next, in step 2515, the terminal transmits identification information included in the selected signal, that is, identification information of another terminal which has transmitted the selected signal, to the base station. In step 2517, the terminal determines whether location information of the D2D terminal, that is, of the terminal which uses the identification information transmitted in step 2515, is received or not. When the location information is received, the terminal proceeds to step 2519 to determine the terminal's own location according to the received information.

In step 2501, when the terminal is not in the RRC idle state, the terminal proceeds to step 2521 to determine whether transmission powers are used or not. When the transmission powers are used, the terminal proceeds to step 2523 to transmit an aid request for positioning to the base station. In this case, the aid request may include a parameter informing that the transmission powers are requested. Next, in step 2525, the terminal receives D2D communication signals and detects identification information and transmission power level information from the D2D communication signals. In step 2527, the terminal measures reception powers regarding the D2D communication signals. Thereafter, in step 2529, the terminal generates a new power reference using the transmission powers and the reception powers. In other words, the terminal calculates a power value which is reduced by power control using the transmission powers and the maximum transmission power, and calculates a modified reception power by adding the reduced power value and the reception power measured in step 2527. Thereafter, in step 2513, the terminal selects a signal which has the maximum modified reception power. Next, in step 2515, the terminal transmits identification information included in the selected signal, that is, identification information of another terminal which has transmitted the selected signal, to the base station. In step 2517, the terminal determines whether location information of the D2D terminal, that is, of the terminal which uses the identification information transmitted in step 2515, is received or not. When the location information is received, the terminal proceeds to step 2519 to determine the terminal's own location according to the received information.

In step 2521, when the transmission powers are not used, the terminal proceeds to step 2531 to transmit an aid request for positioning to the base station. Herein, the aid request may include a parameter informing that distance information is requested. Next, in step 2533, the terminal receives D2D communication signals and detects identification information and TA size information from the D2D communication signals. In step 2535, the terminal measures receptions times regarding the D2D communication signals. Thereafter, in step 2537, the terminal selects a candidate group of the D2D terminals using the TA and the reception times. After selecting the candidate group, in step 2539, the terminal measures reception powers regarding the selected D2D communication signals. Thereafter, in step 2541, the terminal selects a signal which has the maximum reception power from the selected candidate group. Next, in step 2515, the terminal transmits identification information included in the selected signal, that is, identification information of another terminal which has transmitted the selected signal, to the base station. In step 2517, the terminal determines whether location information of the D2D terminal, that is, location information of the terminal using the identification information transmitted in step 2515, is received or not. When the location information is received, the terminal proceeds to step 2519 to determine the terminal's own location according to the received information.

As described above, the terminal 120 determines proximity based on the reception powers and performs positioning using the proximity. In another positioning method, a propagation delay of a signal may be used. This is because the propagation delay is influenced by a physical distance between the base station 110 and the terminal 120. Accordingly, an operation time (for example, time of transmitting and receiving signals) of the terminal may be determined or a location of the terminal may be determined using the propagation delay. However, when the propagation delay is used, the accuracy of measurement of the location or operation time may depend on a communication environment of the terminal 120. Hereinafter, an example of a wireless environment of the terminal 120 will be described in FIG. 26.

Figure 26:
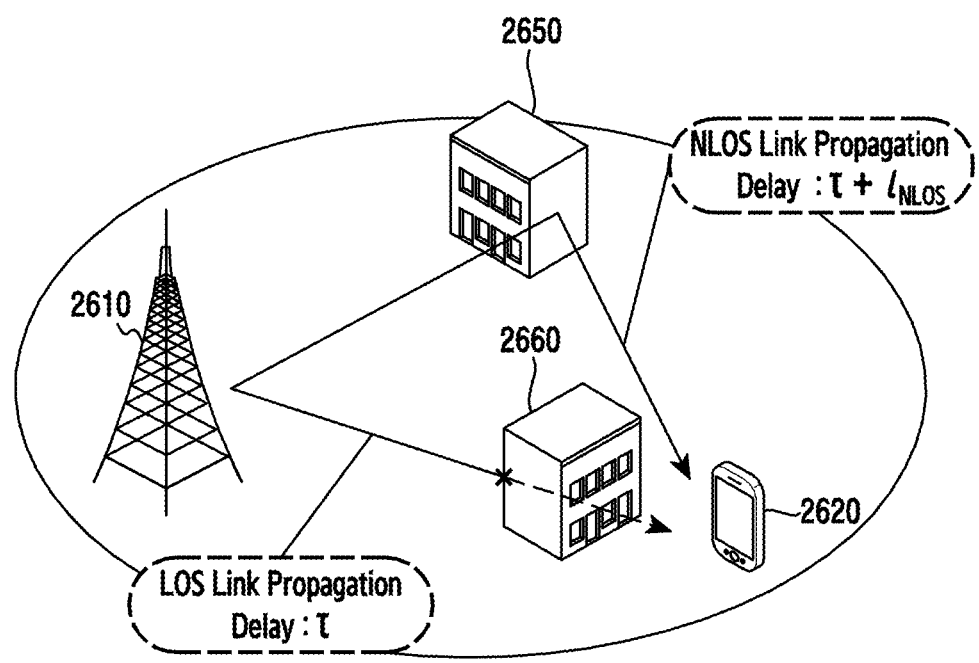
FIG. 26 illustrates an example non-line of sight (NLOS) environment in a wireless communication system according to an exemplary embodiment of the present disclosure.

FIG. 26 illustrates an example non-line of sight (NLOS) environment in a wireless communication system according to an exemplary embodiment of the present disclosure. Referring to FIG. 26, due to obstacles 2650 and 2660 (for example, a building, a wall) located in a line of sight (LOS) path between a terminal 2620 and a base station 2610, a signal transmitted from the base station 2610 may be received through a reflection path.

The terminal 2620 discovers a time point at which the maximum power is measured in order to detect a reference signal transmitted from the base station 2610. When obstacles are located in the LOS path between the terminal 2620 and the base station 2610, a signal power is greatly reduced due to a penetration loss. Accordingly, the terminal 2620 does not detect a signal at the time when the signal is received through the LOS path. On the other hand, since a signal on the NLOS path which suffers from a reflection loss by being reflected by other obstacles has a relatively great power, the terminal 2620 detects a time at which the signal on the NLOS path is received. However, since the signal received at the detected time is received through the NLOS path, that is, a detour path, rather than the LOS path between the terminal 2620 and the base station 2610, that is, a direct path, a positive error occurs regarding the reception time as much as a path difference. This may cause a problem that a distance between the terminal 2620 and the base station 2610 is estimated longer than the real distance between the terminal 2620 and the base station 2610. For example, a problem shown in FIG. 27 may occur.

Figure 27:
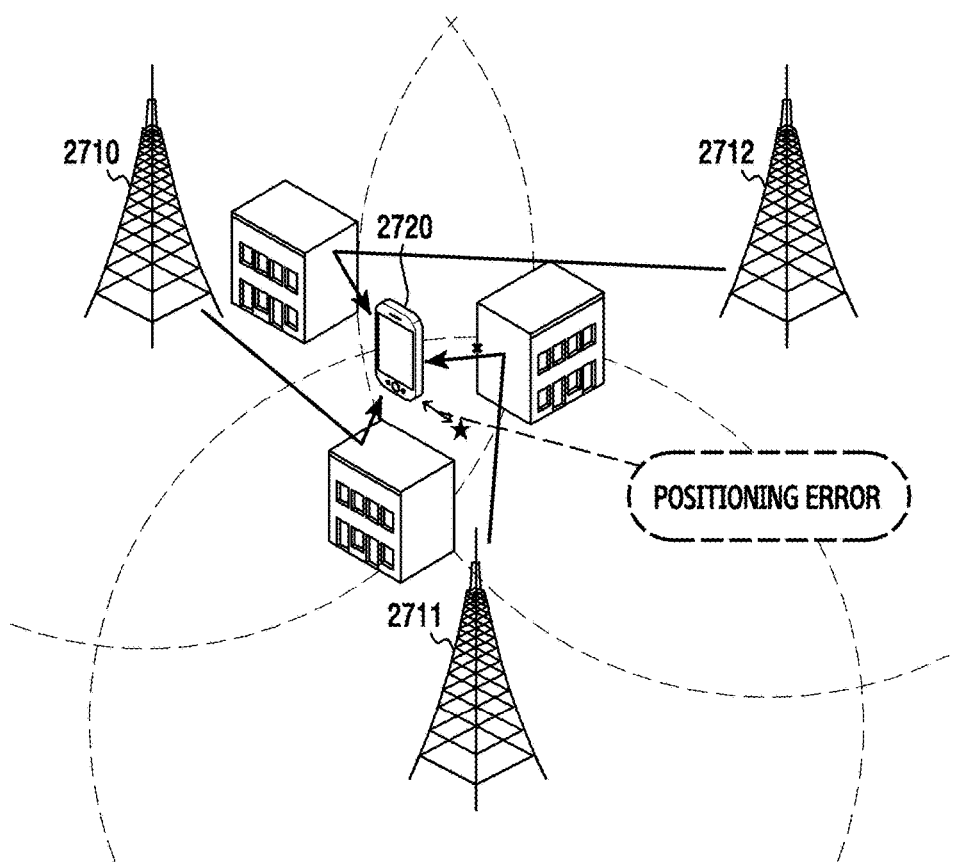
FIG. 27 illustrates an example positioning error caused by NLOS in a wireless communication system according to an exemplary embodiment of the present disclosure.

FIG. 27 illustrates an example positioning error caused by NLOS in a wireless communication system according to an exemplary embodiment of the present disclosure. FIG. 27 illustrates an example of a situation in which positioning technology using a propagation delay is used. Referring to FIG. 27, the location of a terminal 2720 may be estimated based on a propagation delay on each of base stations 2710 to 2712. However, since the terminal 2720 is placed in the NLOS environment, the propagation delay does not exactly reflect a physical distance. Accordingly, a positioning error may occur.

Since a recent wireless communication environment includes not only existing large base stations, but also small base stations or access points (APs), it is easy to guarantee a plurality of reference nodes for positioning. In view of positioning performance, it is advantageous to utilize a small number of reference nodes having no NLOS delay, rather than utilizing a large number of reference nodes including an NLOS delay. Accordingly, when it is possible to distinguish a link having an NLOS delay from a plurality of links, positioning performance can be enhanced by excluding the link having the NLOS delay. In addition, when it is possible to identify NLOS, an NLOS reduction technique of appropriate performance may be adaptively used from among various NLOS reduction techniques. That is, the terminal 120 or the base station 110 can be more efficiently operated in terms of operation complexity by applying a high-performance reduction technique to a link where a big NLOS delay occurs.

Accordingly, in the present disclosure, embodiments for identifying whether an NLOS delay occurs in a wireless communication link between a base station and a terminal will be described. The NLOS link identification technique, which will be described below, uses a value which changes according to signal propagation distance to a base station from among values measurable in the wireless environment. This is based on the technical fact that, when terminals are so close to perform D2D communication, values changing according to a signal propagation distance in the same LOS environment are the same or similar. That is, a communication environment may be inferred by using a value which changes according to a distance to a base station from among various values measurable in a wireless environment. For example, a value changing according to a signal propagation distance may include a transmission power or TA. According to an exemplary embodiment, it may be determined whether an NLOS delay occurs on a base station-terminal link by comparing transmission powers of the terminal 120 to be identified and neighbor terminals. In this case, embodiments for determining whether an NLOS delay occurs on a base station-terminal link by using a D2D signal will be described.

As described above, the terminals in the wireless communication system may perform open loop power control. This is to make a signal transmitted by a terminal arrive at a base station with a constant power regardless of a distance between the base station and the terminal. Accordingly, terminals having similar physical distances to a base station through an LOS path use similar transmission powers according to the principle of the open loop power control. The influence of the NLOS environment on the open loop power control is shown in FIG. 28.

Figure 28:
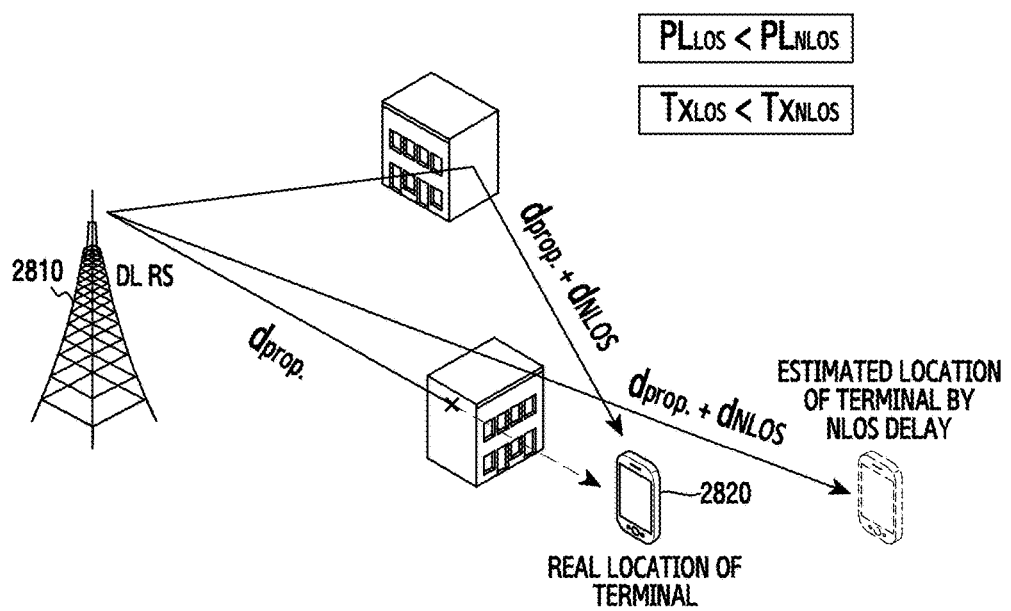
FIG. 28 illustrates an example change in a transmission power made by an NLOS environment in a wireless communication system according to an exemplary embodiment of the present disclosure.

FIG. 28 illustrates an example change in a transmission power caused by an NLOS environment in a wireless communication system according to an exemplary embodiment of the present disclosure. Referring to FIG. 28, a link between a terminal 2820 and a base station 2810 is an NLOS link. Accordingly, a propagation delay $(=d_{prop.}+d_{NLOS})$ which is larger than a propagation delay $(d_{prop.})$ of an LOS link by $D_{NLOS}$ occurs. Accordingly, when the link between the terminal 2820 and the base station 2810 is determined as the LOS link, in other words, $d_{prop.}+d_{NLOS}$ is determined as the propagation delay of the LOS link, an estimated location of the terminal may be different from a real location.

In addition, when the terminal-base station link has an NLOS delay as shown in FIG. 28, the terminal 2820 suffers from a relatively big path loss in comparison to an LOS path environment due to a distance increased as much as the NLOS delay and the propagation delay. As a result, the terminal 2820 performs communication using a higher transmission power than in the case of the LOS path under the open loop power control.

Accordingly, it may be estimated that a terminal which uses an abnormally higher transmission power than neighbor terminals has an NLOS link with a base station, based on a characteristic that the terminal performs open loop power control when transmitting an uplink signal. Since terminals located at similar locations have similar distances to the base station, it is common that the terminals have similar transmission powers. Accordingly, according to various exemplary embodiments, the presence/absence of NLOS on the terminal-base station link may be determined by comparing the transmission power levels of neighbor terminals.

To identify an NLOS link by comparing transmission power levels, transmission powers of neighbor terminals may be compared. However, since the open loop power control determines transmission powers without feedback to the base station, the base station may not know the transmission power level of the terminals. In addition, each terminal knows only the terminal's own transmission power level and may not know transmission power levels of the neighbor terminals. Accordingly, in order to estimate the transmission power levels of the terminals necessary for identifying an NLOS link, the present disclosure describes embodiments of using data or measurement information in a D2D signal exchanged between the terminals. Accordingly, the presence/absence of an NLOS link may be determined through a procedure shown in FIG. 29.

Figure 29:
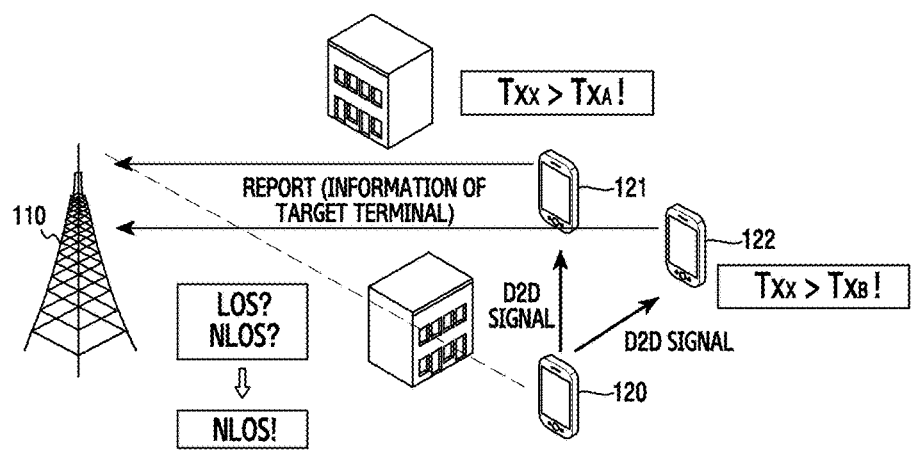
FIG. 29 illustrates an example procedure of determining an NLOS environment by using neighbor terminals in a wireless communication system according to an exemplary embodiment of the present disclosure.

FIG. 29 illustrates an example determining an NLOS environment using neighbor terminals in a wireless communication system according to an exemplary embodiment of the present disclosure. Referring to FIG. 29, the terminal 120 is in an NLOS environment. The neighbor terminals 121 and 122 receive D2D signals transmitted from the terminal 120 and then estimate a transmission power of the terminal 120. In addition, each of the neighbor terminals 121 and 122 compares the estimated transmission power and transmission power of the terminal 121 and 122, respectively, and reports a result of the comparison to the base station 110. Accordingly, the base station 110 may determine whether a link with the terminal 120 is the NLOS link or not based on the report from the neighbor terminals 121 and 122.

The procedure of determining the presence/absence of an NLOS link according to various exemplary embodiments may be divided into a step of requesting identification of a target terminal, a step of identifying neighbor terminals, a step of reporting a result of identification, and a final determination step. Hereinafter, the respective steps will be described in detail.

Figure 30A:
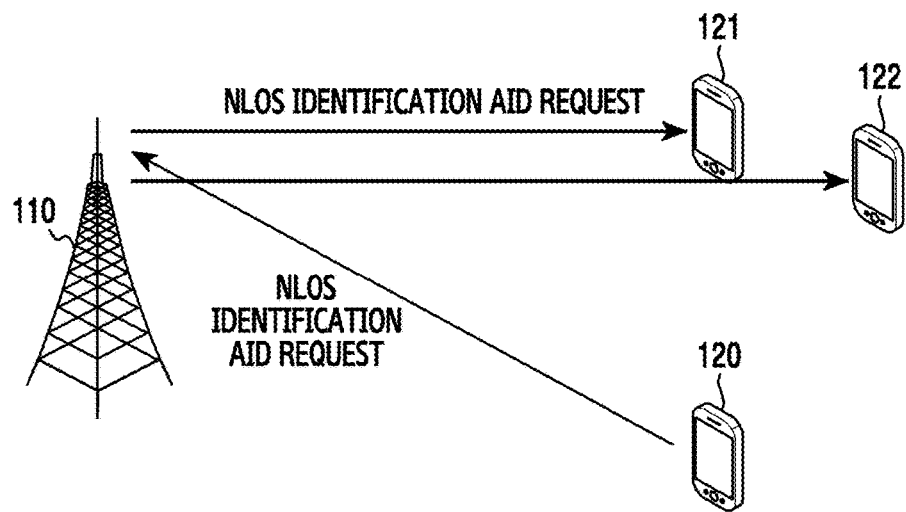
FIGS. 30A and 30B illustrate examples various methods for requesting NLOS identification in a wireless communication system according to an exemplary embodiment of the present disclosure.
Figure 30B:
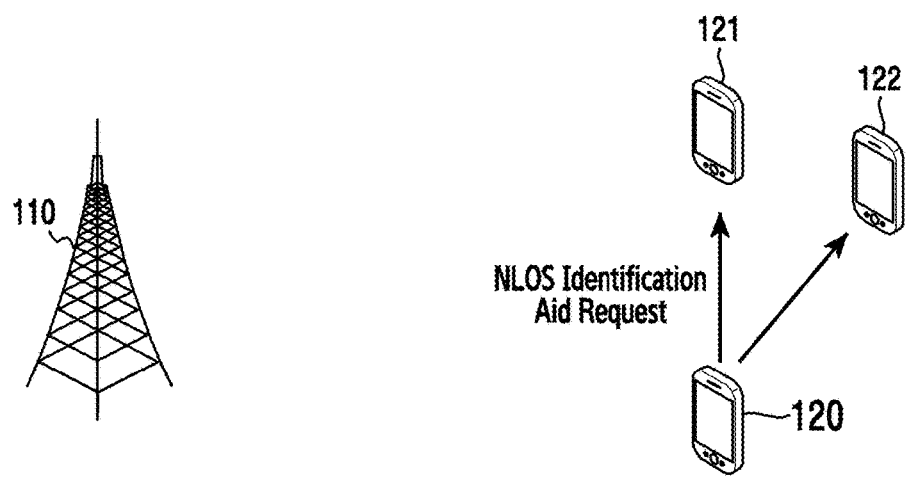

The identification request step may be performed as shown in FIGS. 30A and 30B. FIGS. 30A and 30B illustrate examples various methods for requesting NLOS identification in a wireless communication system according to an exemplary embodiment of the present disclosure. The identification request step refers to a process in which the terminal 120 wanting to identify the presence/absence of an NLOS link requests the base station 110 or neighbor terminals 121 and 122 to identify the NLOS. FIG. 30A illustrates an example of a centered request and FIG. 30B illustrates an example of a distributed request.

Referring to FIG. 30A, the terminal 120 requests the base station 110 to identify the NLOS through an uplink signal. The base station 110 which receives the request requests the terminals 121 and 122 in a cell to aid the terminal 120 in identifying the NLOS through a downlink signal. Referring to FIG. 30B, the terminal 120 directly requests the neighbor terminals 121 and 122 to aid in identifying the NLOS through a D2D signal.

The identification step may be performed as follows. The identification step is a process in which each of the neighbor terminals 121 and 122 requested to assist in identifying the NLOS receives a D2D signal one or more times and then determines the presence/absence of LOS and NLOS. According to various exemplary embodiments, the identification step may be largely divided into a transmission power-based method and a reception power-based method.

According to the transmission power-based method, the terminal 120 may directly transmit the terminal 120's own transmission power level information through a D2D signal. The transmission power level information may be transmitted in the form of a bit in the D2D signal. Accordingly, the neighbor terminals 121 and 122 assisting in identifying the NLOS may directly compare the transmission power levels. For example, a determination is made according to the result of the comparison as shown in Equation 3 presented below:

$Tx_X > (Tx_A + P_{margin}) : NLOS$ $Tx_X < (Tx_A + P_{margin}) : LOS$         Equation 3

In Equation 3, $Tx_X$ is a transmission power of a terminal which requests to determine the presence/absence of NLOS, $Tx_A$ is a transmission power of a terminal which receives an identification request, and $P_{margin}$ is a margin obtained considering a transmission power difference caused by a physical distance under the open loop power control. The margin may be set as an appropriate value to reduce a probability that identification is erroneously performed. The margin may be pre-defined, may be determined by a base station, or may be adaptively determined by measuring a distance between the terminals performing D2D communication.

According to the reception power-based method, the neighbor terminals 121 and 122 assisting in identifying the NLOS estimate the transmission power level of the terminal 120 using the reception power of the D2D signal transmitted by the terminal 120. In addition, the presence/absence of the NLOS may be determined using the estimated transmission power as shown Equation 4 presented below:

$Tx'_X > Tx_A$: NLOS $Tx'_X < Tx_A$: LOS  Equation 4

In Equation 4, $Tx'_X$ is an estimate transmission power of a terminal which requests to determine the presence/absence of NLOS, and $Tx_A$ is a transmission power of a terminal which receives an identification request.

To estimate the transmission power based on the reception power, the neighbor terminals 121 and 122 may use an estimated value of a path loss. For example, the neighbor terminals 121 and 122 may estimate a transmission power using a fixed path loss value occurring regardless of a distance. For example, the transmission power may be estimated as shown in Equation 5:

$Tx'_X \approx Rx_{X \to A} + \min \cdot PL$  Equation 5

In Equation 5, $Tx'_X$ is an estimated transmission power of a terminal which requests to determine the presence/absence of NLOS, $Rx_{X \to A}$ is a measured reception power, and min·PL is a fixed path loss value occurring regardless of a distance, that is, a minimum path loss value.

Figure 31:
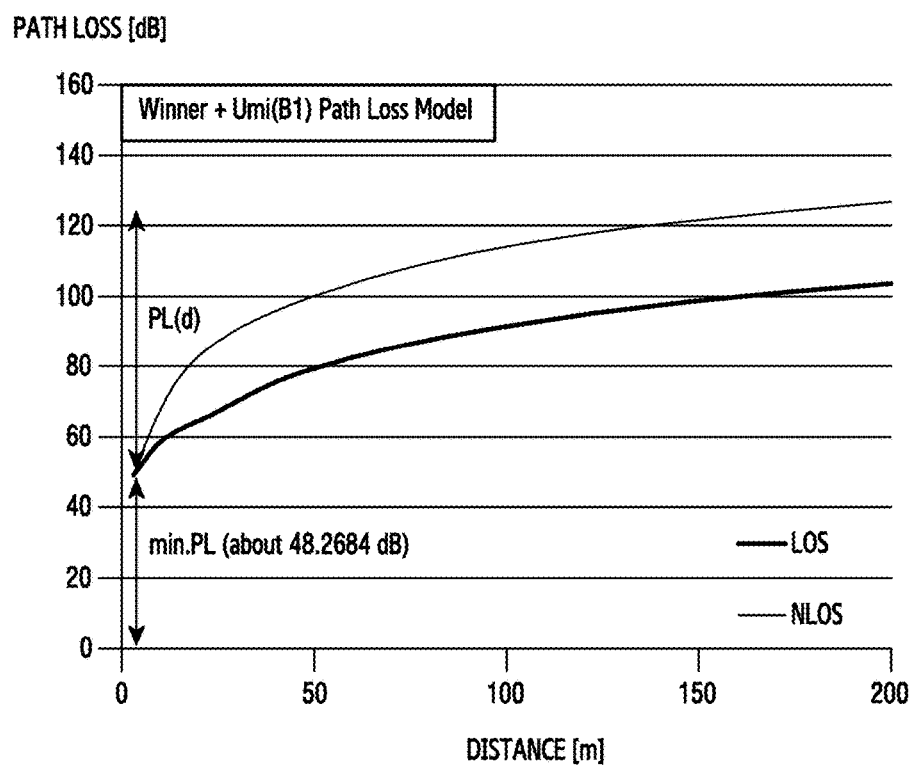
FIG. 31 illustrates an example path loss model in a wireless communication system according to an exemplary embodiment of the present disclosure.

The fixed path loss may be determined according to a path loss model as shown in FIG. 31. FIG. 31 illustrates an example path loss model in a wireless communication system according to an exemplary embodiment of the present disclosure. Referring to FIG. 31, in the case of the LOS environment and the NLOS environment, a path loss increases as a distance increases. However, it is identified that a path loss of about 48.2684 dB fixedly occurs regardless of a distance. Accordingly, the fixedly occurring path loss may be used to estimate a transmission power.

When a reception power is analyzed using the fixed path loss, the reception power may be calculated as shown in Equation 6 presented below:

$Rx_{X \to A} = Tx_X - PL_{X \to A} = Tx_X - \{PL(d)_{X \to A} + \min \cdot PL\} \approx Tx_X - \min \cdot PL$  Equation 6

In Equation 6, $Tx'_X$ is an estimated transmission power of a terminal which requests to determine the presence/absence of NLOS, $Tx_X$ is a transmission power of the terminal which requests to determine the presence/absence of NLOS, $Rx_{X \to A}$ is a measured reception power, $PL(d)_{X \to A}$ is a path loss value which increases according to a distance, and min·PL is a fixed path loss value which occurs regardless of a distance.

The fixed path loss value may be pre-defined in the form of a system configuration based on the path loss model as shown in FIG. 31, or may be adaptively determined according to a communication environment. In addition, each terminal may estimate the fixed path loss value based on a reception power (=maximum reception power) value of a D2D signal transmitted by another terminal closest thereto. Specifically, the terminal may estimate a difference between the terminal's own transmission power and the reception power regarding another terminal closest thereto as the fixed path loss. For example, the fixed path loss value may be estimated as shown in Equation 7 presented below:

$$Tx_A - \max(Rx_{i \to A}) = Tx_A - \max\{Tx_i - PL_{i \to A}\}$$
$$= Tx_A - \max\{Tx_i - [PL(d)_{i \to A} + \min \cdot PL]\}$$
$$= Tx_A - \max\{Tx_i - PL(d)_{i \to A}\} + \min \cdot PL$$
$$\approx \min \cdot PL \ (\because Tx_A \approx Tx_i, \text{ and } d \approx 0)$$

Equation 7

In Equation 7, $Tx_A$ is a transmission power of a terminal A, $Rx_{i \to A}$ is a reception power of a signal transmitted from a terminal i, measured by the terminal A, $PL_{i \to A}$ is a path loss of a channel between the terminal i and the terminal A, $PL(d)_{i \to A}$ is a path loss value which increases according to a distance in the channel between the terminal i and the terminal A, and min·PL is a fixed path loss value.

Figure 32A:
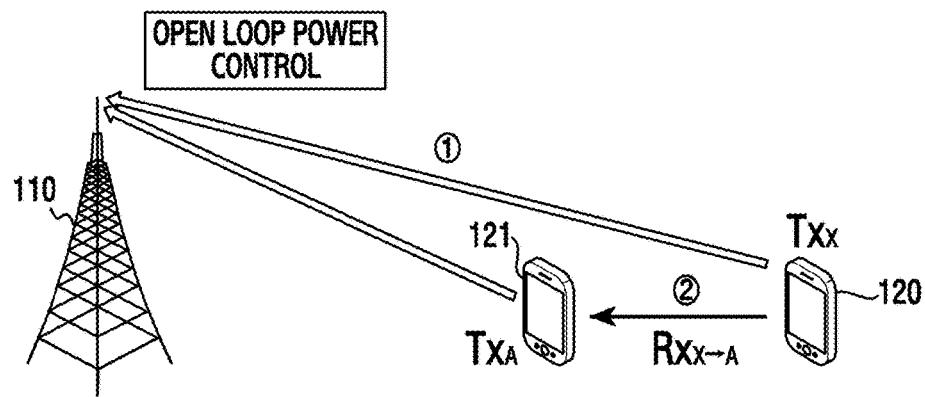
FIGS. 32A and 32B illustrate an example relationship of transmission powers according to power control in a wireless communication system according to an exemplary embodiment.
Figure 32B:
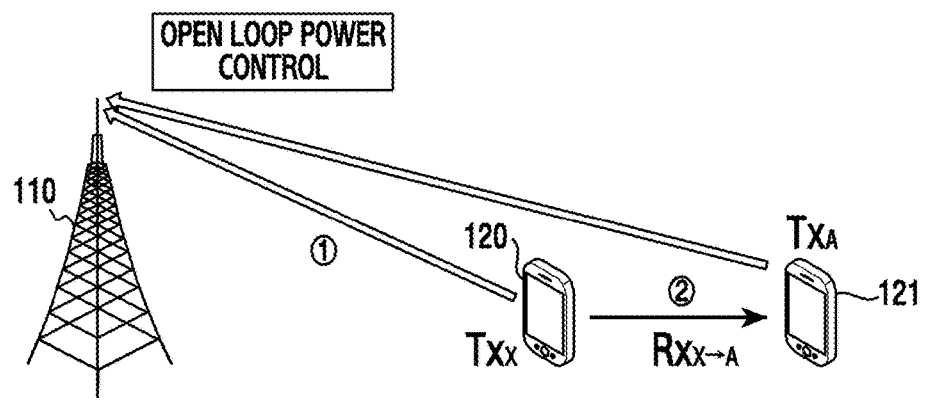

FIGS. 32A and 32B illustrate examples relationship of a transmission power according to power control in a wireless communication system according to an exemplary embodiment of the present disclosure. FIG. 32A illustrates a case in which the terminal 120 uses a greater transmission power, and FIG. 32B illustrates a case in which the terminal 121 uses a greater transmission power. Referring to FIG. 32A, since the terminal 120 is farther from the base station 110 than the terminal 121, the terminal 120 may use a greater transmission power than that of the terminal 121. In this case, when the terminal 121 estimates a transmission power regarding the terminal 120, the estimated transmission power of the terminal 120 may be smaller or equal to the transmission power of the terminal 121 due to a path loss. Referring to FIG. 32B, since the terminal 121 is farther from the base station 110 than the terminal 120, the terminal 121 may use a greater transmission power than that of the terminal 120. In this case, when the terminal 121 estimates a transmission power regarding the terminal 120, the estimated transmission power of the terminal 120 may be smaller than the transmission power of the terminal 121.

In other words, when the neighbor terminals 121 and 122 correctly perform power control according to the distances to the base station 110, the estimated transmission power of the target terminal 120 is never greater than the transmission powers of the neighbor terminals 121 and 122. That is, in the case of an LOS environment as shown in FIGS. 32A and 32B, it is guaranteed that the estimated transmission power of the target terminal 120 is smaller than the transmission powers of the neighbor terminals 121 and 122. In other words, when the estimated transmission power of the target terminal 120 is greater than the transmission powers of the neighbor terminals 121 and 122, this means that there occurs an NLOS delay in the link of the terminal 120.

The above-described NLOS identification operation is performed based on power information. According to another embodiment, instead of power information, TA information may be used to identify NLOS. The TA reflects a distance to the base station 110. Accordingly, when there is an NLOS delay in the link with the base station 110, a corresponding terminal has a greater TA value than those of neighbor terminals and thus the TA may perform the same role as the transmission power information. According to an exemplary embodiment, the terminal 121 detects a TA value in a D2D communication signal transmitted by the terminal 120, and then compares the TA value and the TA value of the terminal 121. When the TA value of the terminal 120 is greater than the TA value of the terminal 121, the terminal 121 may determine that the link of the terminal 120 is an NLOS link.

The identification result reporting step may be performed as follows. According to an exemplary embodiment, the neighbor terminals 121 and 122 may report the result of the identification of the NLOS link regarding the terminal 120 to the base station 110. According to another embodiment, the neighbor terminals 121 and 122 may report the result of the identification of the NLOS link regarding the terminal 120 to the base station 110 with identification information. This is effective when it is determined whether there is an NLOS link regarding a plurality of terminals. According to still another embodiment, the neighbor terminals 121 and 122 may report a difference value between the transmission powers regarding the terminal 120 or a difference value between the TA values to the base station 110. This may be effective when an approximate length of an NLOS delay is to be transmitted.

The final determination step may be performed as follows. The final determination step is a process in which an object (for example, the base station 110, the terminal 120), which receives the result of the identification of the terminals 121 and 122 assisting in identifying the NLOS, finally determines the presence/absence of NLOS based on at least one of the reported results of the identification.

Figure 33:
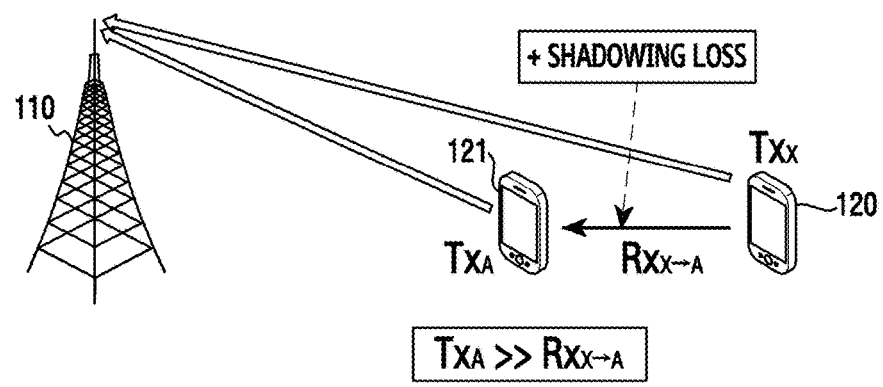
FIG. 33 illustrates an example possibility of an additional loss of power in a wireless communication system according to an exemplary embodiment of the present disclosure.

FIG. 33 illustrates an example possibility of an additional loss of power in a wireless communication system according to an exemplary embodiment of the present disclosure. Referring to FIG. 33, when the target terminal 120 transmits a D2D signal, a reception power measured by the terminal 121 is smaller than a transmission power due a reduced path. Furthermore, due to an influence by a channel situation such as an obstacle, a shadowing loss may further occur. Accordingly, the reception power may be measured smaller than the value reduced by the reduced path.

In other words, due to the characteristic of the path loss which becomes more serious at a short distance and the shadowing loss additionally occurring in measuring the reception power, the following detection characteristics appear. First, even when the terminal 120 is an NLOS link and thus uses a great transmission power, an estimated transmission power of the terminal 120 may be smaller than or equal to a transmission power of the terminal 121 due to the big path loss. To this end, an NLOS link may be wrongly identified as an LOS link. Accordingly, even when the LOS link is identified according to the above-described procedure, there is a possibility that the LOS link is an NLOS link. On the other hand, when the terminal 120 is an LOS link, the terminal 120 uses a small transmission power and thus there is a very low possibility that the estimated transmission power of the terminal 120 is greater than the transmission power of the terminal 121. That is, it is not probable that the LOS link is wrongly identified as the NLOS link. In other words, when the NLOS link is identified according to the above-described technique, there is a very low possibility that the NLOS link is identified as the LOS link.

As a result, according to various exemplary embodiments, the LOS determination may have high miss detection but have a very low false alarm. Accordingly, even when a small number of terminals from among a large number of terminals (for example, one terminal) is determined as having NLOS, the miss detection can be greatly reduced by identifying a corresponding link as the NLOS link. Contrary to this, a number of terminals greater than or equal to a threshold may be determined as having LOS to make a final determination that terminals have an LOS link. Herein, the threshold may be defined by a total number of all terminals, a specific ratio, or a specific number.

Figure 34:
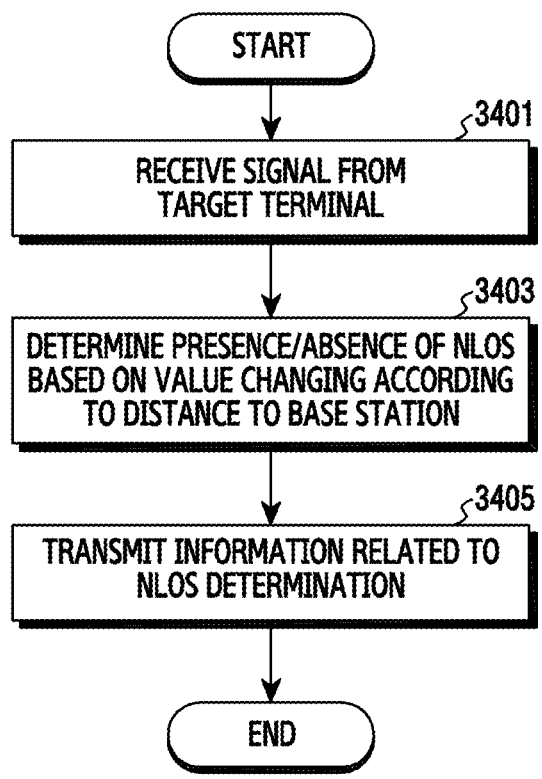
FIG. 34 illustrates an example method for operating of a terminal which determines the presence/absence of NLOS in a wireless communication system according to an exemplary embodiment of the present disclosure.

FIG. 34 illustrates an example method for operating of a terminal which determines the presence/absence of NLOS in a wireless communication system according to an exemplary embodiment of the present disclosure. FIG. 34 illustrates an example of a method for operating of the terminal 121 or terminal 122.

Referring to FIG. 34, in step 3401, the terminal receives a signal from a target terminal. The signal is a D2D signal and may be a D2D communication signal, a D2D discovery signal, a D2D synchronization signal, or a signal defined for determining the presence/absence of NLOS. According to various exemplary embodiments, the signal may include a transmission power or TA of the target terminal.

In step 3403, the terminal determines the presence/absence of NLOS based on values which change according to a distance to the base station. Herein, the distance refers to a signal propagation distance rather than a physical distance. For example, as a value changing according to a distance to the base station, a transmission power or TA may be used. When the transmission power is used, the terminal may estimate a transmission power of the target terminal or identify transmission power information included in the signal received in step 3401. In addition, the terminal compares the terminal's own transmission power and the transmission power of the target terminal. As a result, when the transmission power of the terminal is smaller than the estimated transmission power of the target terminal, the terminal determines that a link of the target terminal is an NLOS link. Alternatively, when the signal received in step 3401 includes transmission power information, and a sum of the transmission power of the terminal and a power margin is smaller than the transmission power of the target terminal, the terminal may determine that the link of the target terminal is an NLOS link. When the TA is used, the terminal may identify information regarding the TA of the target terminal included in the signal, and, when the TA of the target terminal is greater than the TA of the terminal, the terminal determines that the link of the target terminal is an NLOS link.

Thereafter, in step 3405, the terminal transmits information related to the NLOS determination. In this case, according to various exemplary embodiments, the terminal may transmit the information related to the NLOS determination to the base station or to the target terminal. In addition, according to various exemplary embodiments, the terminal may transmit information on the presence/absence of NLOS, transmit information on the presence/absence of NLOS and identification information of the target terminal, transmit the transmission powers or TA values, or transmit the results of comparing the transmission powers or the TA values.

Figure 35:
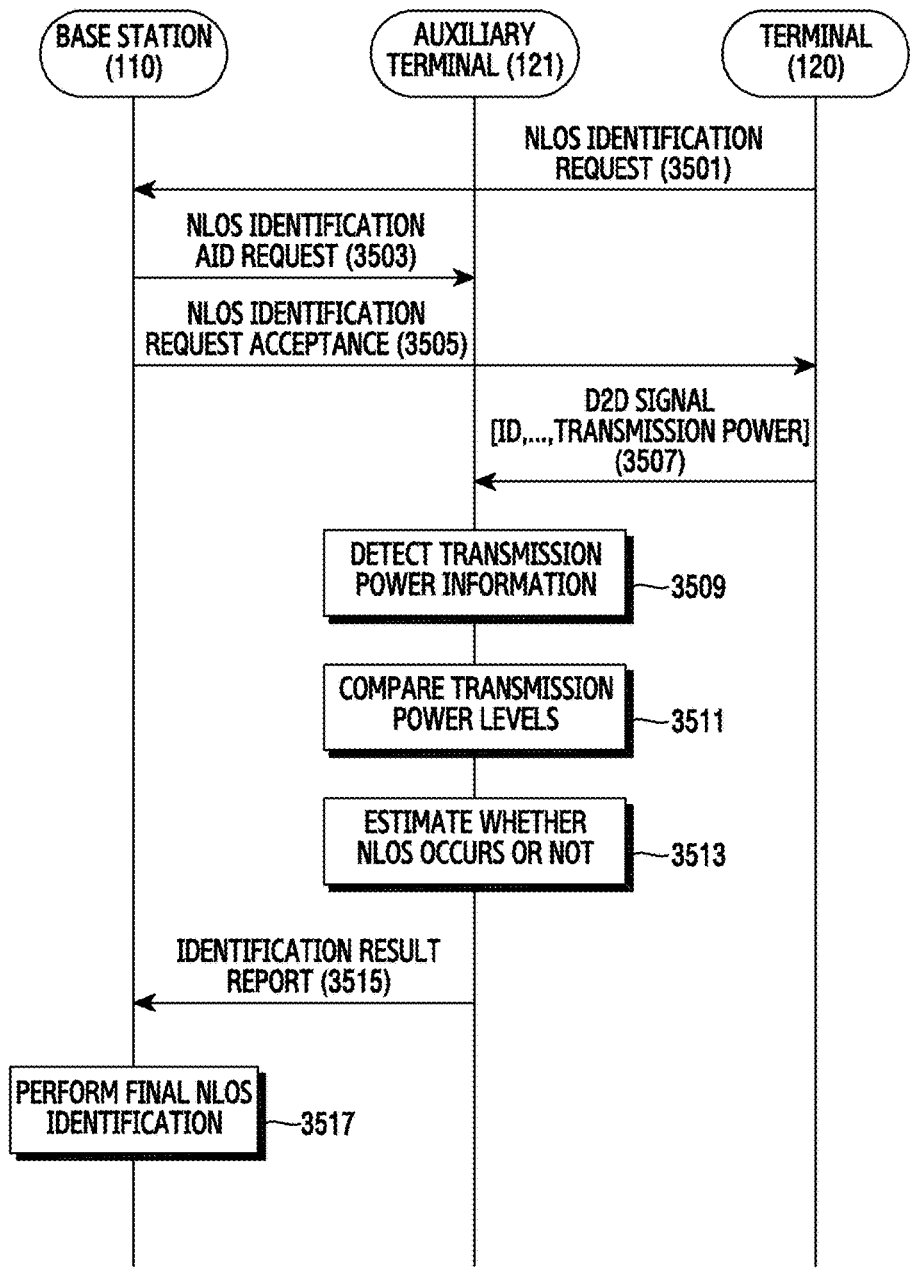
FIG. 35 illustrates an example method for operating of a terminal which determines the presence/absence of NLOS based on transmission powers in a wireless communication system according to an exemplary embodiment of the present disclosure.

FIG. 35 illustrates an example method for operating of a terminal which determines the presence/absence of NLOS based on a transmission power in a wireless communication system according to an exemplary embodiment of the present disclosure. FIG. 35 illustrates a single auxiliary terminal 121, but two or more auxiliary terminals may participate in the procedure of FIG. 35.

Referring to FIG. 35, in step 3501, the terminal 120 transmits an NLOS identification request to the base station 110. In other words, the terminal 120 transmits, to the base station 110, a message requesting the base station 110 to aid in identifying NLOS. For example, the NLOS identification request may be a parameter which is 1 bit long and may be included as a part of another control message or may be configured as a separate message.

In step 3503, the base station 110 transmits an NLOS identification aid request to the terminal 121. In other words, the base station 110 may instruct the terminal 121 to determine whether the link of the terminal 120 is an NLOS link or not. The NLOS identification aid request may include information for instructing to assist in identifying the NLOS and information indicating whether a reception power or a transmission power is used to assist in identifying the NLOS. In this case, the NLOS identification aid request may be a parameter which is 2 bits long. According to another embodiment, the NLOS identification aid request to the terminal 121 may be received from the terminal 120 via a D2D link. In this case, step 3501 may be omitted.

In step 3505, the base station 110 transmits an NLOS identification request acceptance to the terminal 120. In other words, the base station 110 informs the terminal 120 that the request for the NLOS identification is accepted. That is, the base station 110 instructs the terminal 120 to transmit a D2D signal. For example, the NLOS identification request acceptance is a parameter which is 1 bit long and may be included as a part of another control message or may be configured as a separate message.

In step 3507, the terminal 120 transmits a D2D signal. Herein, the D2D signal includes identification information and transmission power information of the terminal 120. The D2D signal may be a D2D communication signal, a D2D discovery signal, a D2D synchronization signal, or a signal defined for identifying NLOS. According to another embodiment, TA information rather than the transmission power information may be included in the D2D signal.

In step 3509, the terminal 121 detects the transmission power information. That is, the terminal 121 may identify the transmission power information included in the D2D signal. According to another embodiment, the terminal 121 may identify the TA information of the terminal 120 included in the D2D signal.

In step 3511, the terminal 121 compares levels of the transmission powers. In this case, the terminal 121 may compare the transmission powers by considering a power margin. Unlike this, when the TA information is not included in the D2D signal, the terminal 121 may compare the terminal 121's own TA and TA of the terminal 120.

In step 3513, the terminal 121 estimates whether NLOS occurs or not. That is, the terminal 121 determines whether the link of the terminal 120 is an NLOS link according to a result of the comparison in step 3511. For example, when a sum of the transmission power of the terminal 121 and the power margin is smaller than the transmission power of the terminal 120, the terminal 121 may determine that the link of the terminal 120 is an NLOS link. According to another embodiment, when the TA of the terminal 120 is greater than the TA of the terminal 121, the terminal 121 may determine that the link of the terminal 120 is an NLOS link.

In step 3515, the terminal 121 transmits an identification result report to the base station 110. The identification result may be configured by a parameter which is 1 bit long and indicates the presence/absence of NLOS. However, according to another embodiment, the identification result report may include the identification information of the terminal 120. According to another embodiment, the identification result report may include information indicating the result of the comparison in step 3511. According to another embodiment, the terminal 121 may transmit the identification result report to the terminal 120. In this case, subsequent step 3517 may be omitted.

In step 3517, the base station 110 performs final NLOS identification. The base station 110 finally determines the presence/absence of NLOS based on the identification result report from the terminal 121. In this case, an identification result report from another terminal in addition to the terminal 121 may further be considered. When a plurality of identification result reports are collected, and a number of reports greater than or equal to a threshold indicate LOS, the base station 110 may determine that the link of the terminal 120 is an LOS link. Otherwise, the base station 110 determines that the link of the terminal 120 is the NLOS link. Although not shown in FIG. 35, the base station 110 may notify the final determination to the terminal 120.

Figure 36:
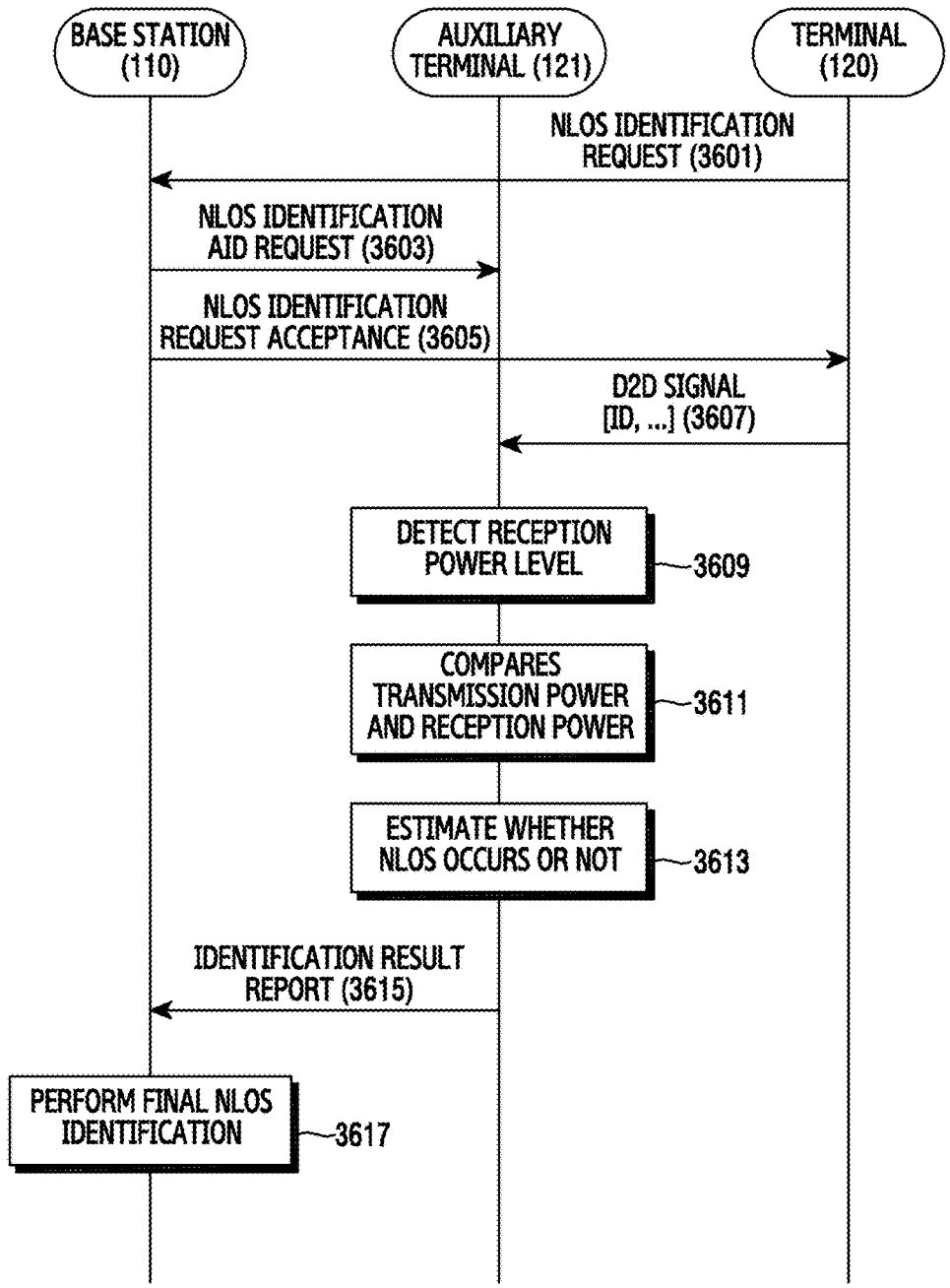
FIG. 36 illustrates an example method for operating of a terminal which determines the presence/absence of NLOS based on reception powers in a wireless communication system according to an exemplary embodiment of the present disclosure.

FIG. 36 illustrates an example method for operating of a terminal which determines the presence/absence of NLOS based on a reception power in a wireless communication system according to an exemplary embodiment of the present disclosure. FIG. 36 illustrates a single auxiliary terminal 121, but two or more auxiliary terminals may participate in the procedure of FIG. 36.

Referring to FIG. 36, in step 3601, the terminal 120 transmits an NLOS identification request to the base station 110. In other words, the terminal 120 transmits, to the base station 110, a message requesting the base station 110 to aid in identifying NLOS. For example, the NLOS identification request may be a parameter which is 1 bit long and may be included as a part of another control message or may be configured as a separate message.

In step 3603, the base station 110 transmits an NLOS identification aid request to the terminal 121. In other words, the base station 110 may instruct the terminal 121 to determine whether the link of the terminal 120 is an NLOS link or not. The NLOS identification aid request may include information for instructing to assist in identifying the NLOS and information indicating whether a reception power or a transmission power is used to assist in identifying the NLOS. In this case, the NLOS identification aid request may be a parameter which is 2 bits long. According to another embodiment, the NLOS identification aid request to the terminal 121 may be received from the terminal 120 via a D2D link. In this case, step 3601 may be omitted.

In step 3605, the base station 110 transmits an NLOS identification request acceptance to the terminal 120. In other words, the base station 110 informs the terminal 120 that the request for the NLOS identification is accepted. That is, the base station 110 instructs the terminal 120 to transmit a D2D signal. For example, the NLOS identification request acceptance is a parameter which is 1 bit long and may be included as a part of another control message or may be configured as a separate message.

In step 3607, the terminal 120 transmits a D2D signal. Herein, the D2D signal includes identification information of the terminal 120. The D2D signal may be a D2D communication signal, a D2D discovery signal, a D2D synchronization signal, or a signal defined for identifying NLOS.

In step 3609, the terminal 121 measures a level of a reception power. That is, the terminal 121 measures a reception power of the D2D signal.

In step 3611, the terminal 121 compares the transmission power of the terminal 121 and the reception power of the D2D signal. In this case, the terminal 121 may compare the transmission power and the reception power by considering a path loss. Specifically, the terminal 121 may estimate the transmission power of the terminal 120 from the reception power of the D2D signal by considering the pass loss, and compare the estimated transmission power of the terminal 120 and the transmission power of the terminal 121.

In step 3613, the terminal 121 estimates whether NLOS occurs or not. That is, the terminal 121 determines whether the link of the terminal 120 is an NLOS link according to a result of the comparison in step 3611. For example, when the transmission power of the terminal 121 is smaller than the estimated transmission power of the terminal 120, the terminal 121 may determine that the link of the terminal 120 is an NLOS link.

In step 3615, the terminal 121 transmits an identification result report to the base station 110. The identification result may be configured by a parameter which is 1 bit long and indicates the presence/absence of NLOS. However, according to another embodiment, the identification result report may include the identification information of the terminal 120. According to another embodiment, the identification result report may include information indicating the result of the comparison in step 3611. According to another embodiment, the terminal 121 may transmit the identification result report to the terminal 120. In this case, subsequent step 3617 may be omitted.

In step 3617, the base station 110 performs final NLOS identification. The base station 110 finally determines the presence/absence of NLOS based on the identification result report from the terminal 121. In this case, an identification result report from another terminal in addition to the terminal 121 may further be considered. When a plurality of identification result reports are collected, and a number of reports greater than or equal to a threshold indicate LOS, the base station 110 may determine that the link of the terminal 120 is an LOS link. Otherwise, the base station 110 determines that the link of the terminal 120 is the NLOS link. Although not shown in FIG. 36, the base station 110 may notify the final determination to the terminal 120.

Figure 37:
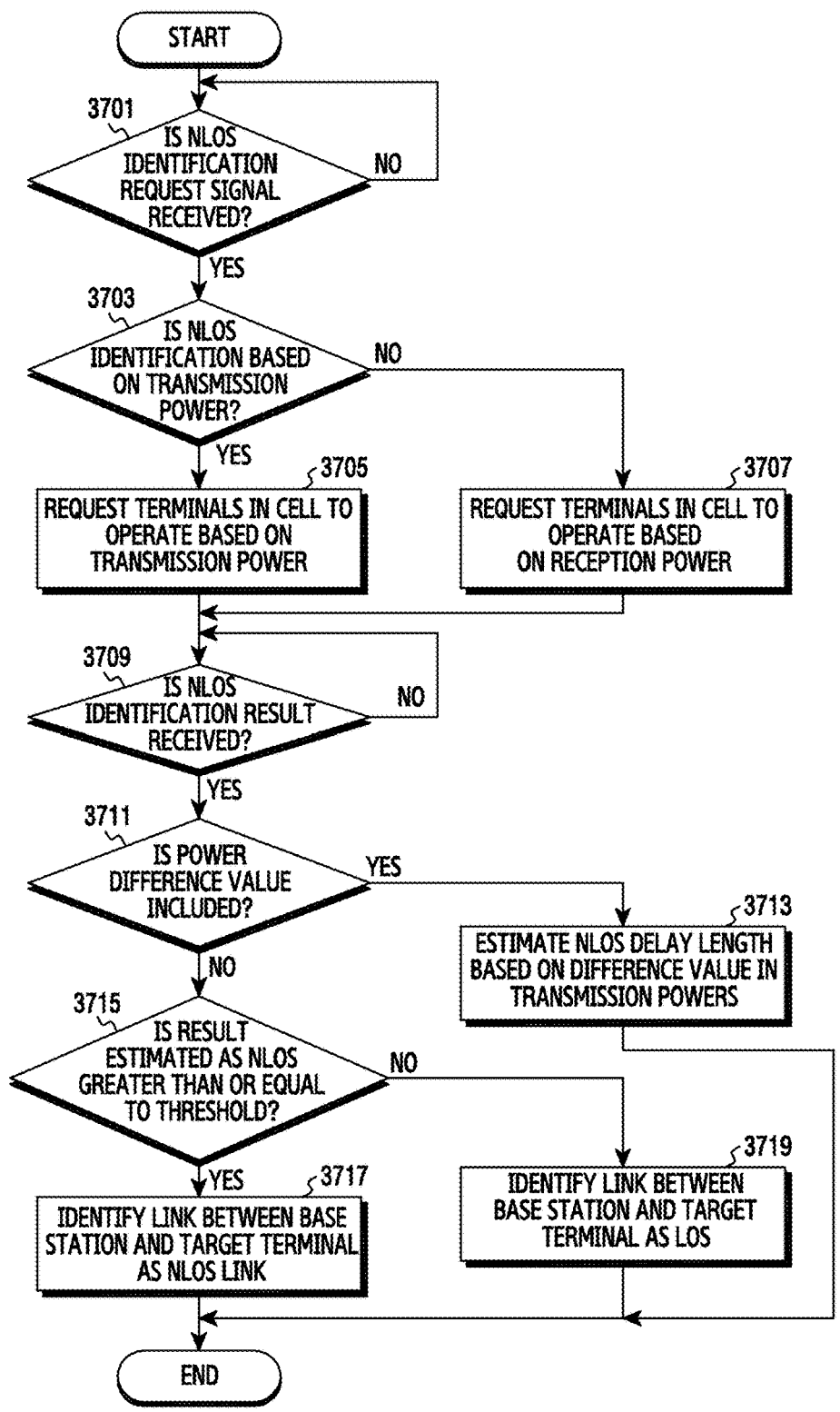
FIG. 37 illustrates an example method for operating of a base station for determining the presence/absence of NLOS in a wireless communication system according to an exemplary embodiment of the present disclosure.

FIG. 37 illustrates an example method for operating of a base station for determining the presence/absence of NLOS in a wireless communication system according to an exemplary embodiment of the present disclosure. FIG. 37 illustrates an example of a method for operating of the base station 110.

Referring to FIG. 37, in step 3701, the base station determines whether an NLOS identification request signal is received or not. When the NLOS identification request signal is received, the base station proceeds to step 3703 to determine whether NLOS identification is performed based on a transmission power. In other words, the base station may determine whether the presence/absence of the NLOS is identified based on a transmission power or a reception power. Whether the NLOS identification is based on the transmission power may be related to whether a target terminal is able to provide transmission power information. Accordingly, whether the NLOS identification is based on the transmission power may be predefined according to system settings or may be determined adaptively according to a net situation. When the NLOS identification is based on the transmission power, the base station proceeds to step 3705 to request terminals in a cell to operate based on the transmission powers. On the other hand, when the NLOS identification is not based on the transmission power, in other words, when the NLOS identification is based on the reception power, the base station proceeds to step 3707 to request the terminals in the cell to operate based on the reception powers.

Thereafter, in step 3709, the base station determines whether an NLOS identification result is received or not. The NLOS identification result may be received from at least one terminal. When the NLOS identification result is received, the base station proceeds to step 3711 to determine whether the identification result includes a power difference value or not. When the power difference value is included, the base station proceeds to step 3713 to estimate an NLOS delay length based on a difference value in the transmission powers. On the other hand, when the power difference value is not included, that is, only the identification result is included, the base station proceeds to step 3715 to determine whether the result estimated as the NLOS is greater than or equal to a threshold. When the result estimated as the NLOS is greater than or equal to the threshold, the base station proceeds to step 3717 to identify the link between the base station and the target terminal as an NLOS link. On the other hand, when the result estimated as the NLOS is less than the threshold, the base station proceeds to step 3719 to identify the link between the base station and the target terminal as an LOS link.

Figure 38:
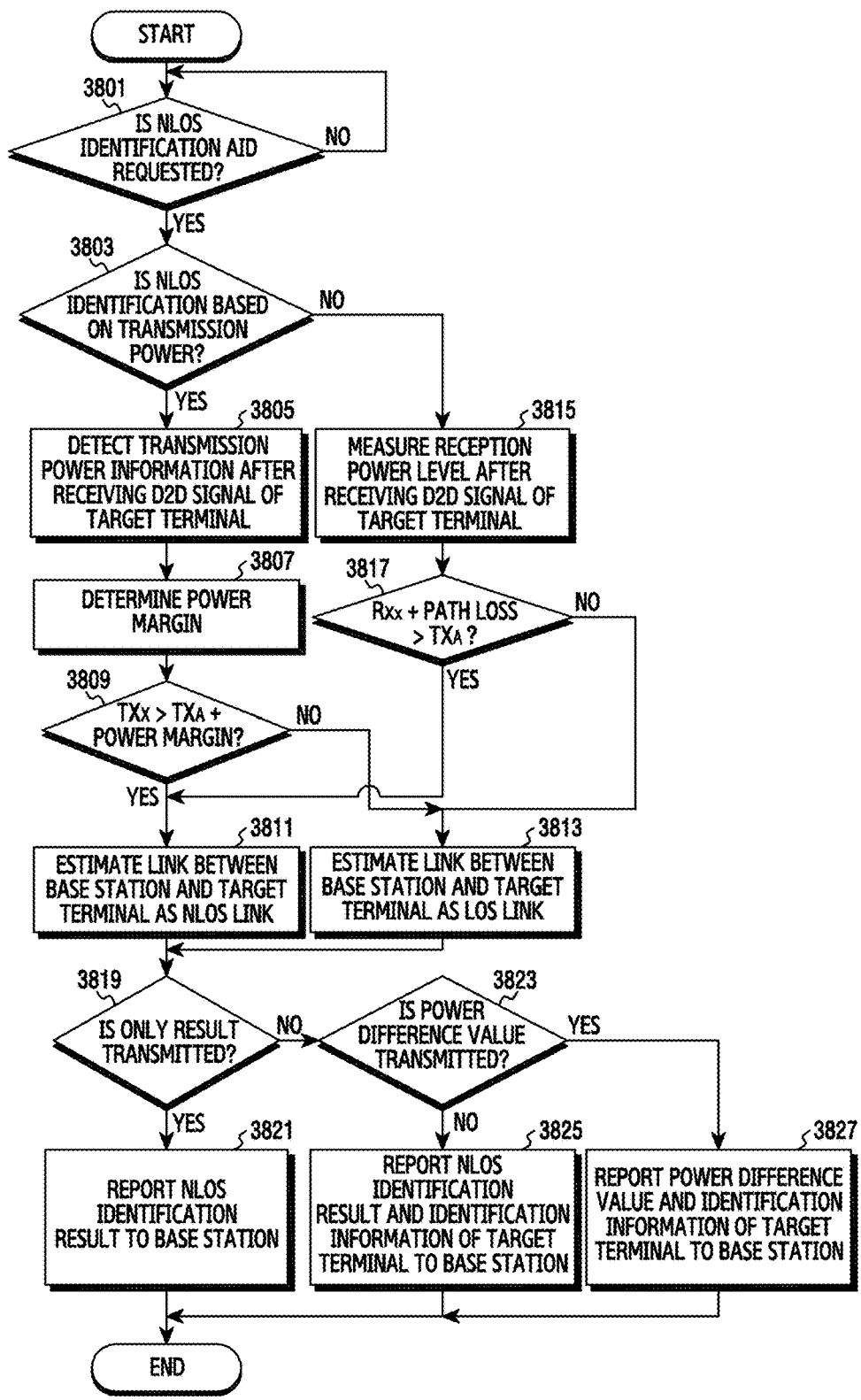
FIG. 38 illustrates an example method for operating of a terminal for determining the presence/absence of NLOS in a wireless communication system according to an exemplary embodiment of the present disclosure.

FIG. 38 illustrates an example method for operating of a terminal for determining the presence/absence of LOS in a wireless communication system according to an exemplary embodiment of the present disclosure. FIG. 38 illustrates an example of a method for operating of the terminal 121.

Referring to FIG. 38, in step 3801, the terminal determines whether an NLOS identification aid request is received or not. When the NLOS identification aid request is received, the terminal proceeds to step 3803 to determine whether NLOS identification based on a transmission power is requested or not. For example, whether the NLOS identification is based on the transmission power may be indicated by a parameter included in the NLOS identification aid request.

When the NLOS identification is based on the transmission power, the terminal proceeds to step 3805 to receive a D2D signal of a target terminal and detect transmission power information from the D2D signal. Next, in step 3807, the terminal determines a power margin. The power margin may be a pre-defined value or may be provided by a base station. Thereafter, in step 3809, the terminal compares a sum of the terminal's own transmission power and the power margin with a transmission power of the target terminal. When the transmission power of the target terminal is greater than the sum of the transmission power of the terminal and the power margin, the terminal proceeds to step 3811 to estimate a link between the base station and the target terminal as an NLOS link. On the other hand, when the transmission power of the target terminal is smaller than or equal to the sum of the transmission power of the terminal and the power margin, the terminal proceeds to step 3813 to estimate the link between the base station and the target terminal as an LOS link.

In step 3803, when the NLOS identification is not based on the transmission power, in other words, when the NLOS identification is based on a reception power, the terminal proceeds to step 3815 to receive a D2D signal of the target terminal and measure a reception power level of the D2D signal. Next, in step 3817, the terminal compares a sum of the reception power and a path loss with the terminal's own transmission power. When the sum of the reception power and the path loss is greater than the transmission power of the terminal, the terminal proceeds to step 3811 to estimate the link between the base station and the target terminal as an NLOS link. On the other hand, when the sum of the reception power and the path loss is smaller than or equal to the transmission power of the terminal, the terminal proceeds to step 3813 to estimate the link between the base station and the target terminal as an LOS link.

In step 3819 after step 3811 or 3813, the terminal determines whether to transmit only an identification result. When only the identification result is transmitted, the terminal proceeds to step 3821 to report the NLOS identification result to the base station. On the other hand, when only the identification result is not reported, the terminal proceeds to step 3823 to determine whether to transmit a power difference value. When the power difference value is not transmitted, the terminal proceeds to step 3825 to report the NLOS identification result and the identification information of the target terminal to the base station. On the other hand, when the power difference value is transmitted, the terminal proceeds to step 3827 to report the power difference value and the identification information of the target terminal to the base station.

According to the above-described various exemplary embodiments, the terminal may perform positioning or determine the presence/absence of an NLOS link using D2D signals. Positioning techniques and performance of NLOS identification techniques according to various exemplary embodiments will be described hereinafter.

To identify the performance of the positioning technique, results of simulations in a case in which terminals use the same transmission power and a case in which terminals use power-controlled transmission powers will be described. Indexes for evaluating the performance are a cumulative distribution function (CDF) of a positioning coordinate error root mean square error (RSME), and average coordinate error RSME performance according to a distance between a base station and a terminal. In addition, a probability of increasing a coordinate error in comparison to an open loop power control environment, and an increasing rate of a coordinate error occurring when a coordinate error increases are considered as performance indexes.

Figure 39:
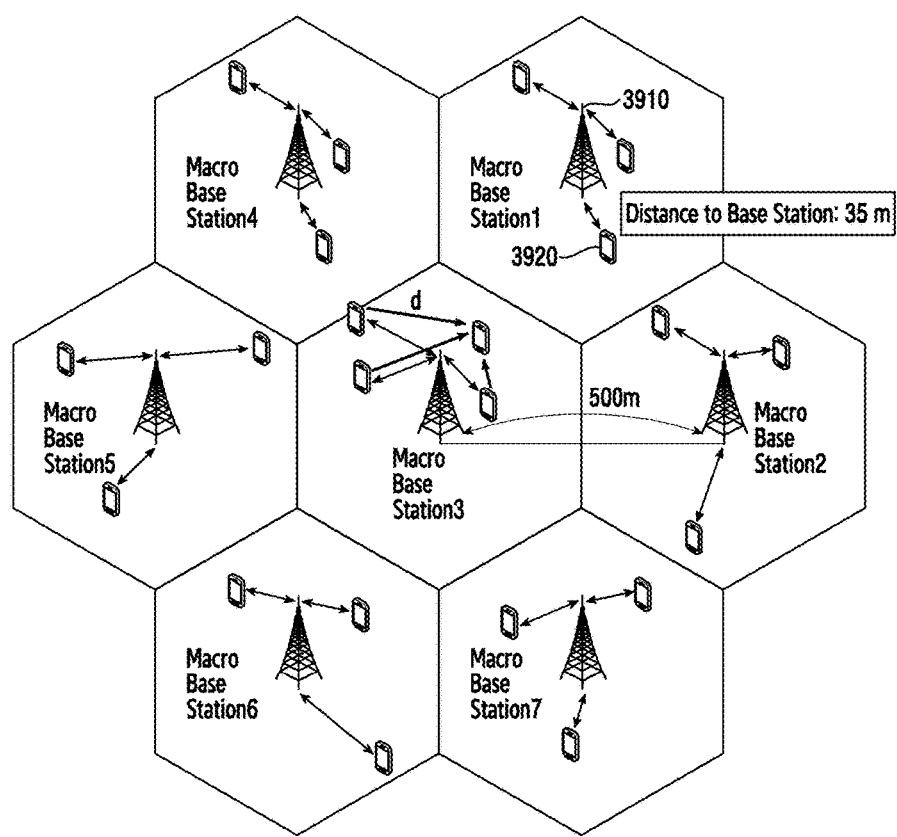
FIG. 39 illustrates an example simulation environment for evaluating performance of a wireless communication system according to an exemplary embodiment of the present disclosure.

A cell environment for a simulation is shown in FIG. 39. FIG. 39 illustrates an example simulation environment for evaluating performance of a wireless communication system according to an exemplary embodiment of the present disclosure. Referring to FIG. 39, there are seven base stations and a plurality of terminals per cell. From among these, a distance between a terminal 3920 and a base station 3910 is 35 meters. A path loss model used in the simulation is an LTE D2D standard outdoor-to-outdoor model defined in the LTE specification. Other simulation parameters are shown in table 1 presented below:

TABLE 1

| Parameters | Values |
| --- | --- |
| Inter station distance (ISD) | 500 m |
| Height of the base station/Height of the terminal | 25 m/1.5 m |
| Number of base stations/Number of target terminals | 7/1 |
| Number of D2D terminals | 150 per sector |
| Maximum power of 2D2 terminals | 23 dBm |
| $P_O$ of the path loss model | −103 dbm |
| α of the path loss model | 1.0 |
| Noise power | −174 dBm/Hertz |
| Noise figure | 9 dB |
| Target terminal dropping | Random dropping into 1 cell of the base station |
| D2D terminal dropping | Random dropping into each sector |
| Minimum distance between the terminal and the base station | 35 m |
| $w_1$, $w_2$ | $w_1 = 1$, $w_2 = 2$ |
| Time offset threshold ($d_y$) | 30 m |
| Distance threshold ($\tau_y$) | 30 m |

FIGS. 40 to 47 illustrate examples results of the simulation of the wireless communication system according to an exemplary embodiment of the present disclosure.

Figure 40:
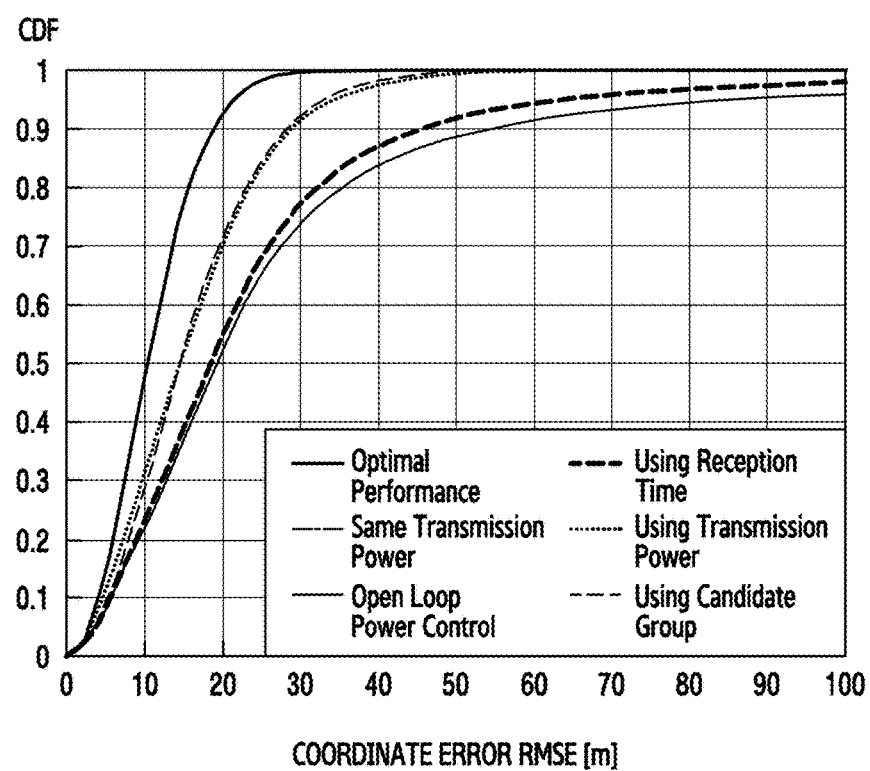
FIGS. 40 to 47 illustrate examples results of a simulation of a wireless communication system according to an exemplary embodiment of the present disclosure.
Figure 41:
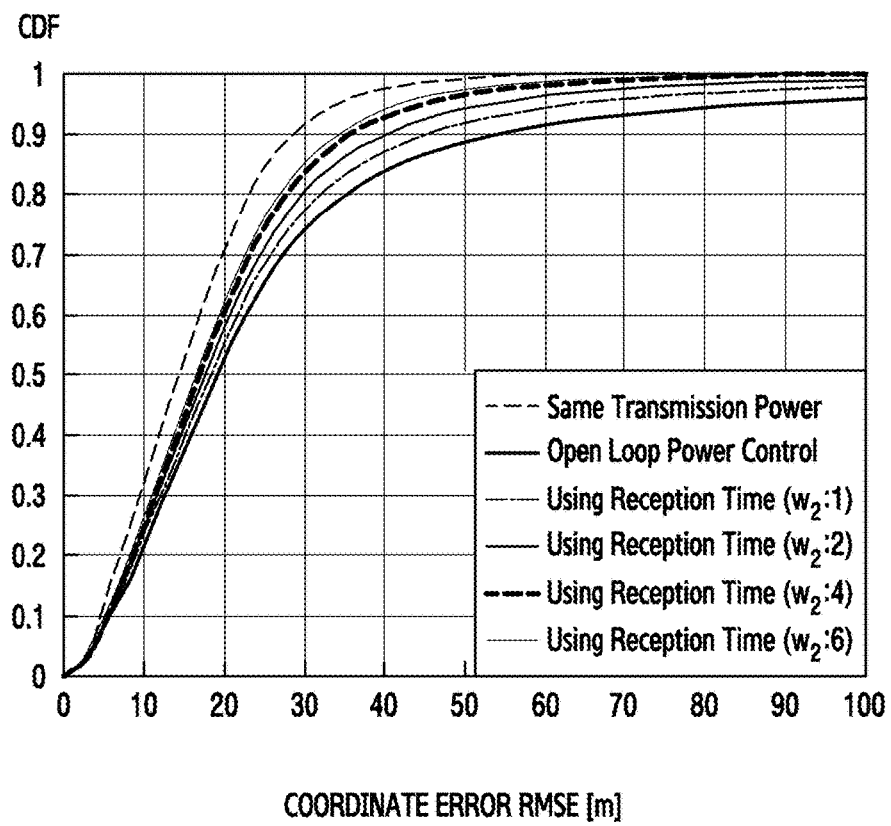

FIGS. 40 and 41 illustrate CDF performance of a coordinate error RSME. Specifically, FIGS. 40 and 41 illustrate the CDF performance of the coordinate error RSME when proximity-based positioning is performed. Optimal performance is performance of positioning based on an inter-terminal distance, and is the most ideal performance result when proximity-based positioning is performed to select the closest D2D terminal to a terminal. As shown in FIG. 40, positioning using a reception time achieve minor improvements in comparison to an open loop power control environment, and positioning using a transmission power and positioning using a candidate group show similar performance to that of a same transmission power environment. FIG. 40 shows the result of variously changing the second weight $w_2$ for reception time information in positioning using the reception time. It can be seen that, as the weight for the reception time information increases, the performance of positioning enhances, and the weight may be set by considering a cell radius of a cellular network.

Figure 42:
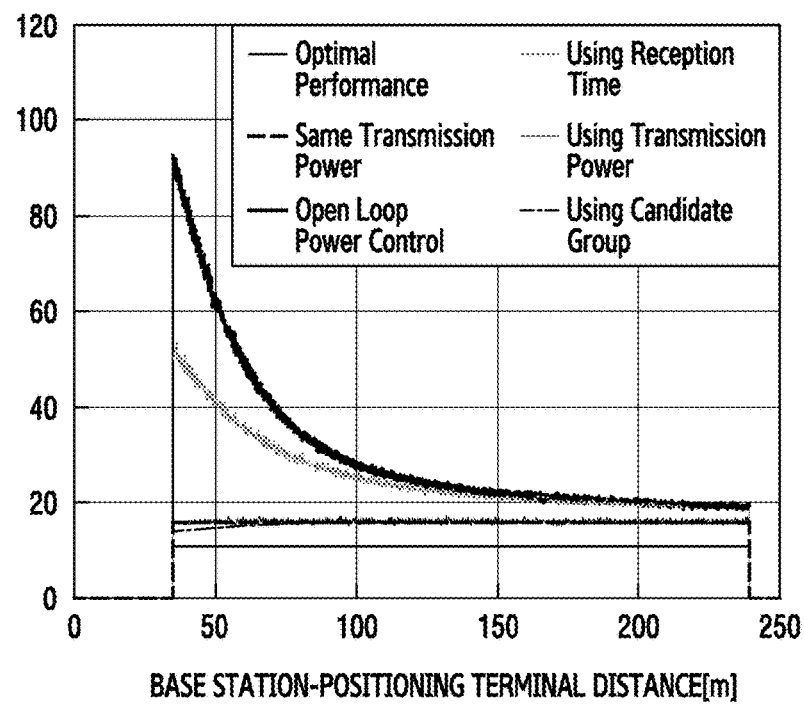
Figure 43:
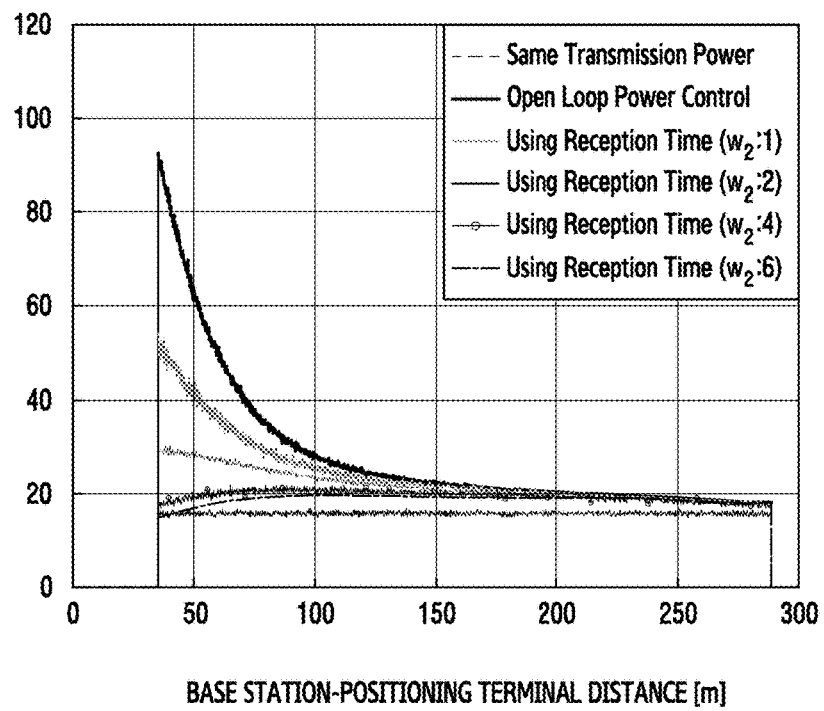

FIGS. 42 and 43 illustrate average coordinate error RSME performance according to a distance between a base station and a target terminal. Since the performance of proximity-based positioning varies according to a location of a terminal in a cell, it can be seen through indexes shown in FIGS. 42 and 43 that the performance of positioning of a suggested technique is averagely enhanced in comparison to related-art methods regardless of the location of a terminal. Referring to FIG. 42, positioning using a reception time enhances the performance when the terminal is located at a cell center (about 35-125 meters). Positioning using a transmission power has similar performance to that of the same transmission power environment. FIG. 43 shows the performance as a result of applying a weight to reception time information when positioning is performed using a reception time. Referring to FIG. 43, it can be seen that, as the weight increases, the accuracy of location positioning regarding an environment in which the terminal is located at the center of the cell is greatly enhanced. This means that an effect of positioning by determining proximity using a reception time is enhanced.

Figure 44:
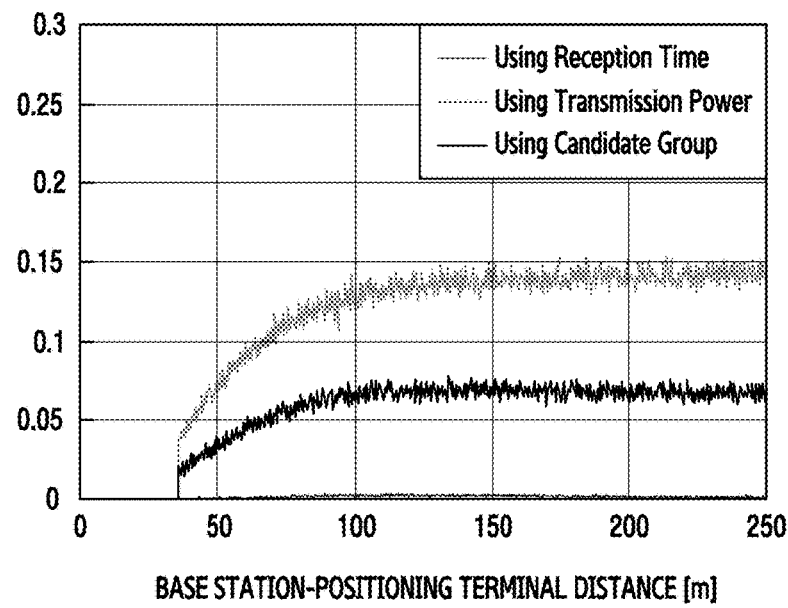
Figure 45:
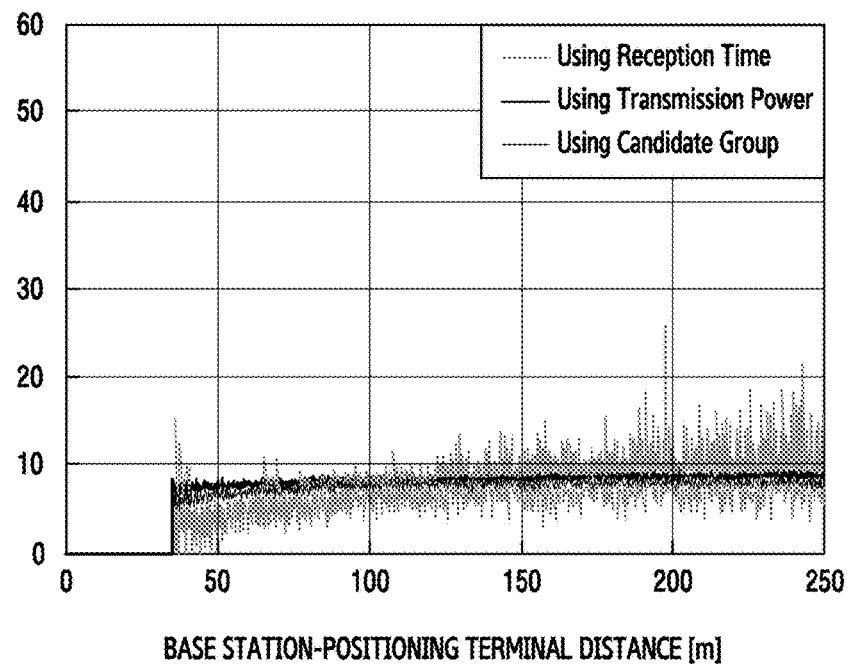

FIGS. 44 and 45 show a probability of increasing a coordinate error in comparison to an open loop power control environment, and an increasing rate of the coordinate error. When positioning is performed using a reception time, a coordinate error may increase as much as 7.63 m with a probability of 0.002 in comparison to the open loop power control environment, and a performance enhancement rate is low, but the coordinate error is stably reduced. Positioning using a transmission power may increase the coordinate error as much as 8.43 m with a probability of 0.13, and positioning using a candidate group may increase the coordinate error as much as 7.71 m with a probability of 0.06. When the positioning using the transmission power and the positioning using the candidate group are performed, some coordinate error may increase, but it can be seen that an overall effect can be enhanced.

Setting parameters of a simulation for LOS identification performance are shown in table 2 presented below:

TABLE 2

| Parameters | Values |
| --- | --- |
| Number of terminals | 150 per sector |
| ISD | 500 m |
| Minimum distance between terminals | 3 m |
| Minimum distance between the base station and the terminal | 35 m |
| Height of the terminal | 1.5 m |
| Height of the base station | 25 m |

TABLE 2-continued

| Parameters | Values |
| --- | --- |
| Transmission power of the terminal | Open loop power control |
| Power margin | 7 dB |

FIG. 45 illustrates NLOS identification DER performance according to the number of terminals assisting in identifying NLOS. It is assumed that a length of an NLOS delay occurring between a terminal requesting NLOS identification and a base station is 100 m. As shown in FIG. 45, when NLOS identification is based on a transmission power, it is possible to exactly compare transmission powers and thus a high degree of identification accuracy of 90% or higher can be shown even when there is one terminal assisting in identifying. On the other hand, when NLOS identification is based on a reception power, the identification is performed based on information estimated through the reception power, and thus, when there is one terminal assisting in identifying, identification accuracy of about 75% is shown. However, in the two embodiments, as the number of terminals assisting in identifying increases, the identification accuracy is greatly enhanced due to a final identification process performed in the base station. It can be seen that, in an environment in which there is four terminals assisting in identifying, the two embodiments show that the NLOS identification is possible with accuracy of about 99%.

Figure 46:
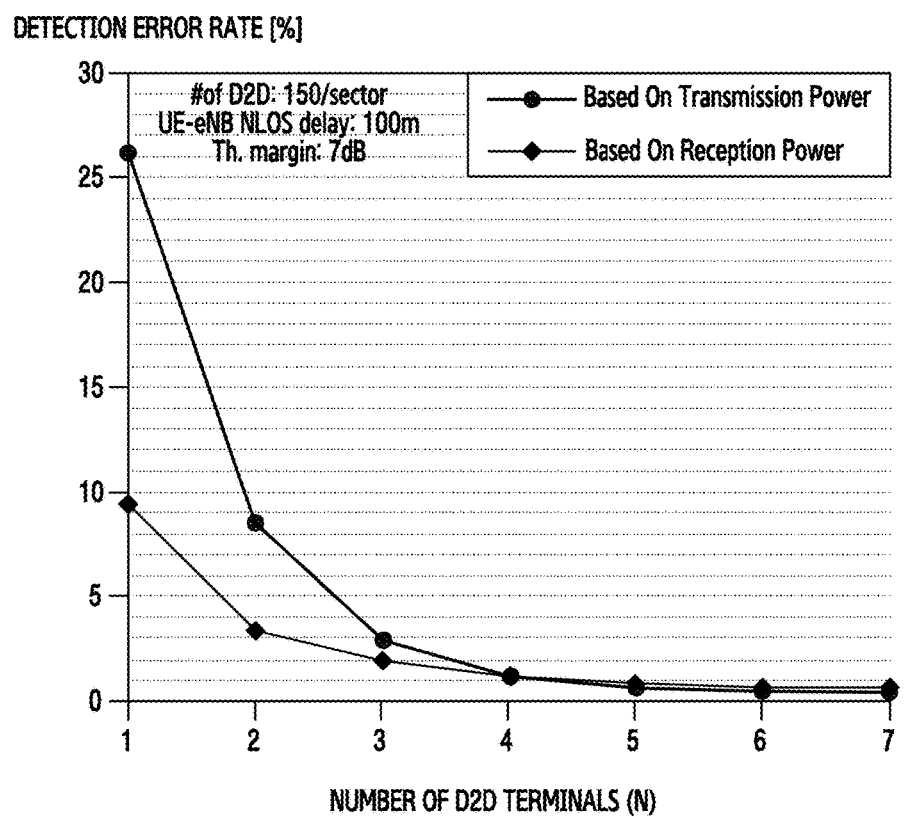
Figure 47:
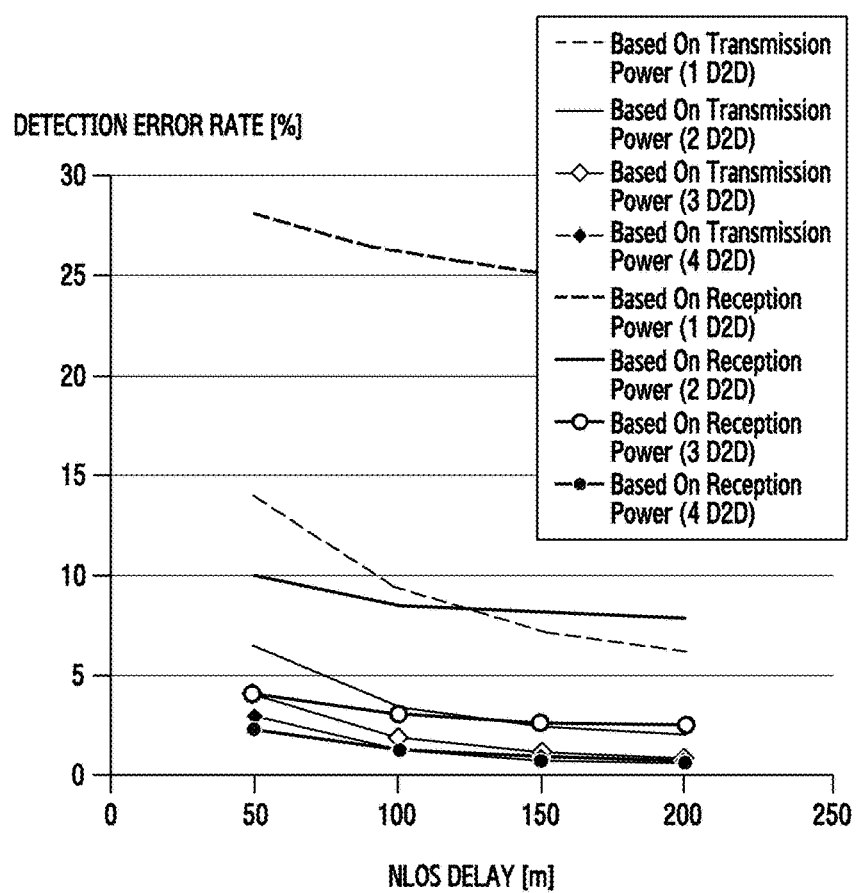

FIG. 46 shows NLOS identification DER performance according to a length of a NLOS delay between an NLOS identification requesting terminal and the base station 110. Specifically, in FIG. 46, the NLOS identification DER performance according to the length of the NLOS delay between the terminal requesting NLOS identification and the base station is analyzed according to an identification scheme and the number of terminals assisting in identifying. As can be seen from FIG. 45, in the case of a technique according to embodiments, as the length of the NLOS delay increases, a difference in the transmission power between the terminals becomes evident and thus identification accuracy is enhanced. In addition, when it is guaranteed that the number of terminals assisting in identifying NLOS is 3 in an environment where the length of the NLOS delay is 50 m, the technique according to embodiments can achieve a high degree of identification accuracy of about 95%.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A first terminal in a wireless communication system, the first terminal comprising:
a transceiver configured to receive a signal from a second terminal that is in proximity to the first terminal; and
at least one processor configured to:
determine a minimum path loss based on a transmission power of the first terminal and a reception power regarding a third terminal which is closest to the first terminal,
determine a first value that is a variable value according to a distance between the second terminal and a base station based on reception power of the signal and the minimum path loss, and
determine whether a link between the second terminal and the base station is non-line of sight (NLOS) by comparing the first value with a second value, wherein the second value is a variable value according to a distance between the first terminal and the base station, wherein the first value is larger than the second value when the link between the second terminal and the base station is NLOS.

2. The first terminal of claim 1, wherein the at least one processor is further configured to:
identify transmission power information included in the signal, and
if a transmission power of the second terminal is greater than a sum of a transmission power of the first terminal and a power margin, determine the link as NLOS.

3. The first terminal of claim 1, wherein the at least one processor is further configured to:
estimate a transmission power of the second terminal by adding a path loss value to a reception power of the signal, and
if the estimated transmission power of the second terminal is greater than a transmission power of the first terminal, determine the link as NLOS.

4. The first terminal of claim 1, wherein the at least one processor is further configured to:
identify TA information of the second terminal included in the signal, and determine the link as NLOS if a timing advance (TA) value of the second terminal is greater than a TA value of the first terminal.

5. The first terminal of claim 1, wherein the first terminal and the second terminal perform a device-to-device (D2D) communication.

6. A method for operating a first terminal in a wireless communication system, the method comprising:
receiving a signal from a second terminal that is in proximity to the first terminal;
determining a minimum path loss based on a transmission power of the first terminal and a reception power regarding a third terminal which is closest to the first terminal;
determining a first value that is a variable value according to a distance between the second terminal and a base station based on reception power of the signal and the minimum path loss; and
determining whether a link between the second terminal and the base station is non-line of sight (NLOS) by comparing the first value with a second value, wherein the second value is a variable value according to a distance between the first terminal and the base station, wherein the first value is larger than the second value when the link between the second terminal and the base station is NLOS.

7. The method of claim 6, further comprising:
identifying transmission power information included in the signal; and
if a transmission power of the second terminal is greater than a sum of a transmission power of the first terminal and a power margin, determining the link as NLOS.

8. The method of claim 6, further comprising:
estimating a transmission power of the second terminal by adding a path loss value to a reception power of the signal; and
if the estimated transmission power of the second terminal is greater than a transmission power of the first terminal, determining the link as NLOS.

9. The method of claim 6, further comprising:
identifying TA information of the second terminal included in the signal; and
determining the link as NLOS if a timing advance (TA) value of the second terminal is greater than a TA value of the first terminal.

10. The method of claim 6, wherein the first terminal and the second terminal perform a device-to-device (D2D) communication.

* * * * *